(12) United States Patent
Tabata et al.

(10) Patent No.: US 6,993,181 B2
(45) Date of Patent: Jan. 31, 2006

(54) IMAGE COMPRESSION DECODING APPARATUS AND METHOD THEREOF

(75) Inventors: Sunao Tabata, Yokohama (JP); Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 737 days.

(21) Appl. No.: 09/955,312

(22) Filed: Sep. 19, 2001

(65) Prior Publication Data

US 2003/0053703 A1    Mar. 20, 2003

(51) Int. Cl.
G06K 9/00    (2006.01)

(52) U.S. Cl. ...................................... 382/166
(58) Field of Classification Search ........ 382/162–167; 358/518–540
See application file for complete search history.

(56) References Cited

U.S. PATENT DOCUMENTS

| | | | | |
|---|---|---|---|---|
| 5,315,413 | A | | 5/1994 | Yamamoto et al. ......... 358/512 |
| 5,742,410 | A | * | 4/1998 | Suzuki ....................... 358/518 |
| 5,768,403 | A | * | 6/1998 | Suzuki et al. ................ 358/2.1 |
| 6,198,841 | B1 | * | 3/2001 | Toyama et al. ............. 382/164 |
| 6,404,919 | B1 | * | 6/2002 | Nishigaki et al. ........... 382/176 |
| 6,480,623 | B1 | * | 11/2002 | Yagishita et al. ........... 382/163 |
| 6,628,833 | B1 | * | 9/2003 | Horie .......................... 382/173 |
| 6,643,399 | B1 | * | 11/2003 | Fujiwara ..................... 382/167 |
| 6,744,921 | B1 | * | 6/2004 | Uchida et al. .............. 382/185 |
| 6,757,421 | B1 | * | 6/2004 | Kubo ......................... 382/149 |

FOREIGN PATENT DOCUMENTS

| | | |
|---|---|---|
| JP | 7-30732 | 1/1995 |
| JP | 7-307869 | 11/1995 |
| JP | 2618988 | 3/1997 |
| JP | 3004272 | 11/1999 |
| JP | 2000-32286 | 1/2000 |

OTHER PUBLICATIONS

U.S. Appl. No. 09/138,284, filed Aug. 21, 1998, Tabata et al.

* cited by examiner

*Primary Examiner*—Jingge Wu
(74) *Attorney, Agent, or Firm*—Foley & Lardner LLP

(57) ABSTRACT

An image compression and decompression apparatus includes a identification section, a conversion section, a characteristics correction section, an image compression section, and a decompression section. The identification section identifies given color image information and outputs an identification signal. The conversion section converts color image information to block-based color image information having a specified length. The characteristics correction section corrects block-based color image information with respect to characteristics thereof in units of the blocks based on an identification signal output from the identification section. The image compression section compresses a corrected image in units of blocks and stores the compressed image in a storage area. The decompression section decompresses a compressed image in units of blocks.

2 Claims, 24 Drawing Sheets

| Brightness table Y | |
|---|---|
| Threshold value | Quantization value |
| X < 8 | 0 |
| 8 ≤ X < 25 | 16 |
| 25 ≤ X < 42 | 33 |
| 42 ≤ X < 59 | 50 |
| 59 ≤ X < 76 | 67 |
| 76 ≤ X < 93 | 84 |
| 93 ≤ X < 110 | 101 |
| 110 ≤ X < 127 | 118 |
| 127 ≤ X < 144 | 135 |
| 144 ≤ X < 161 | 152 |
| 161 ≤ X < 178 | 169 |
| 178 ≤ X < 195 | 186 |
| 195 ≤ X < 212 | 203 |
| 212 ≤ X < 229 | 220 |
| 229 ≤ X < 246 | 237 |
| 246 ≤ X | 255 |

FIG. 10A

| Color difference table IQ | |
|---|---|
| Threshold value | Quantization value |
| X < −224 | −225 |
| −224 ≤ X < −160 | −192 |
| −160 ≤ X < −96 | −128 |
| −96 ≤ X < −16 | −56 |
| −16 ≤ X < 16 | 0 |
| 16 ≤ X < 96 | 56 |
| 96 ≤ X < 160 | 128 |
| 160 ≤ X < 224 | 192 |
| 124 ≤ X | 255 |

FIG. 10B

| Mode | Mode table image | Mode table identification |
|---|---|---|
| 0 | Identification signal | Identification compression |
| 1 | Identification signal | Identification data |
| 2 | Identification not used | Identification compression |
| 3 | Identification not used | No identification |

IMAGE COMPRESSION DECODING APPARATUS AND METHOD THEREOF

BACKGROUND

Recently, along with the widespread use of various image processing apparatuses for digital image processing, there is an increasing demand for a high-performance image compression and decompression apparatus for required image processing. For example, Jpn. Pat. Appln. KOKAI Publication No. 7-307869 discloses a conventional image compression and decompression apparatus. This apparatus smoothes data according to an identification signal before compression and stores compressed data and the identification signal. After decompressing the compressed data, the apparatus performs highlight processing according to the identification signal for improving the image quality. This apparatus provides appropriate highlighting by performing processes according to identification signals corresponding to image types, allowing high-quality image processing after compression and decompression.

However, the image processing such as highlighting does not correspond to compression and decompression, causing a possible problem of accordingly degrading the image quality.

SUMMARY

It is an object of the present invention to provide an image compression and decompression apparatus with greatly decreased image degradation by correcting images through the use of an identification signal in association with compression and decompression.

An image compression and decompression apparatus according to the present invention comprises an identification section which identifies given color image information and outputs an identification signal; a conversion section which converts the color image information to color image information with a specified length in units of blocks; a characteristics correction section which corrects block-based color image information converted in the conversion section with respect to characteristics thereof in units of the blocks based on an identification signal output from the identification section; an image compression section which compresses an image corrected in the characteristics correction section in units of the blocks and stores the compressed image in a storage area; and a decompression section which decompresses a compressed image stored in the storage area in units of the blocks.

According to the above-mentioned structure, the present invention applies block-based characteristics correction to converted color image information in units of blocks and compresses the color image information in units of blocks. The conventional apparatus performs characteristics correction using an identification signal generated in units of pixels and performs compression based on a plurality of pixels, e.g., an average of four pixels. When the compressed image is decompressed using a plurality of pixels, there is a difference between units of processing pixels for the first characteristics-corrected image and the decompression. Consequently, the characteristics-corrected image is not reproduced correctly and causes a problem of, e.g., coloring the black not as pure black. This problem does not occur due to the block-based characteristics correction, compression, and decompression according to the present invention. The present invention provides an image compression and decompression apparatus capable of the characteristics correction, compression, and decompression without degrading the image quality.

BRIEF DESCRIPTION OF THE DRAWINGS

FIG. 10A shows a brightness table for the image compression and decompression apparatus as the second embodiment according to the present invention;

FIG. 10B shows a color difference table for the image compression and decompression apparatus as the second embodiment according to the present invention;

DETAILED DESCRIPTION

Embodiments of the present invention will be described in further detail with reference to the accompanying drawings.

<First Embodiment>

Figure 1:
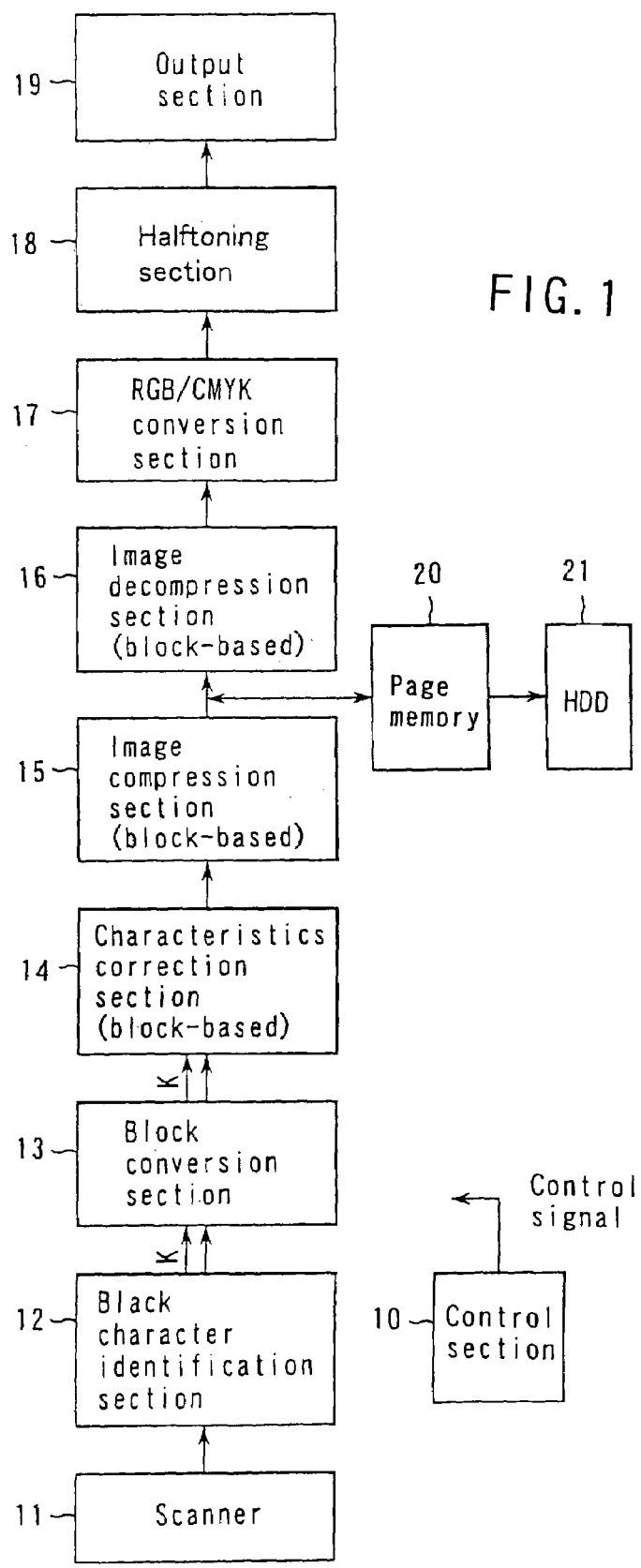
FIG. 1 is a block diagram showing an image compression and decompression apparatus as a first embodiment of the present invention.
Figure 2:
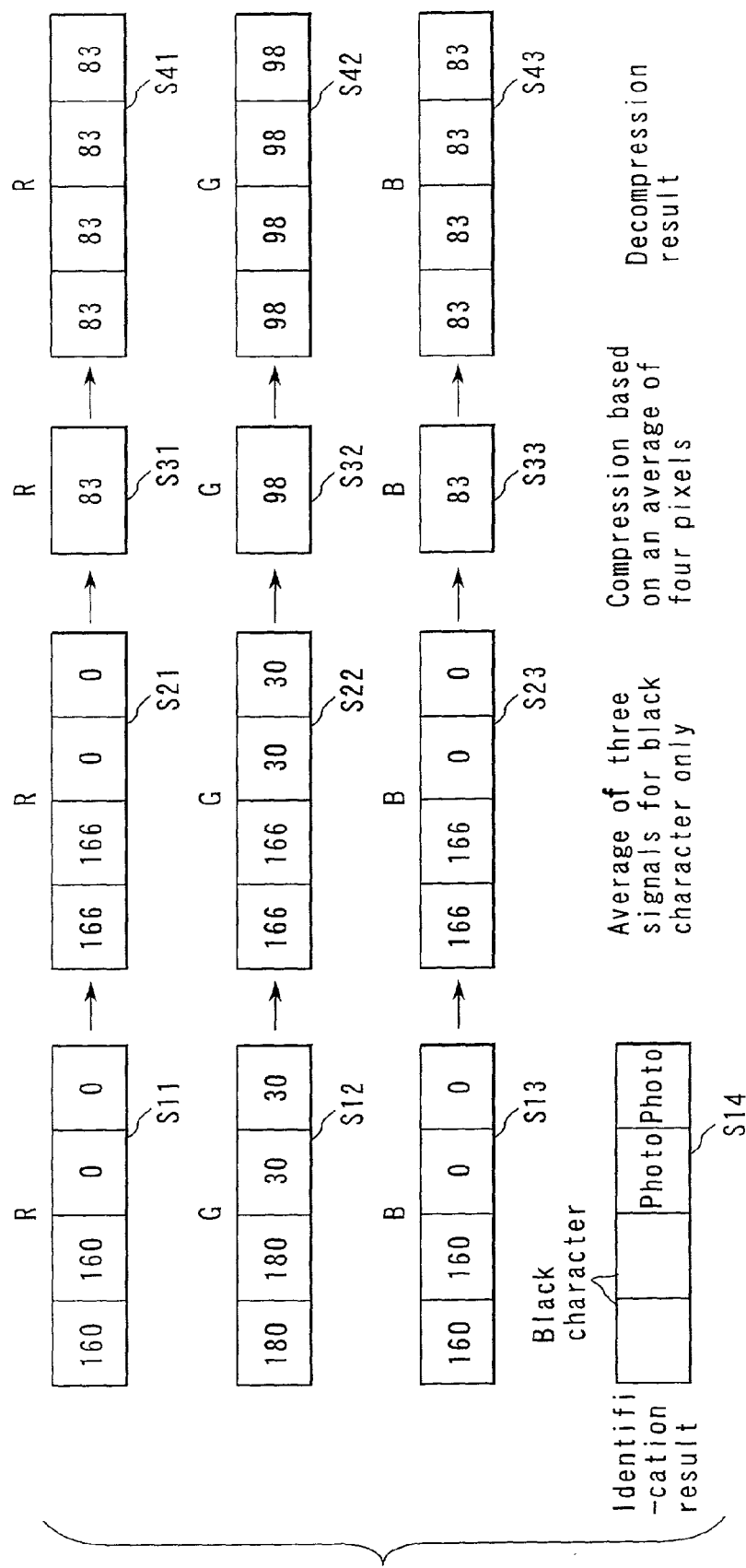
FIG. 2 explains that image correction of the image compression and decompression apparatus does not follow a compression unit.
Figure 3:
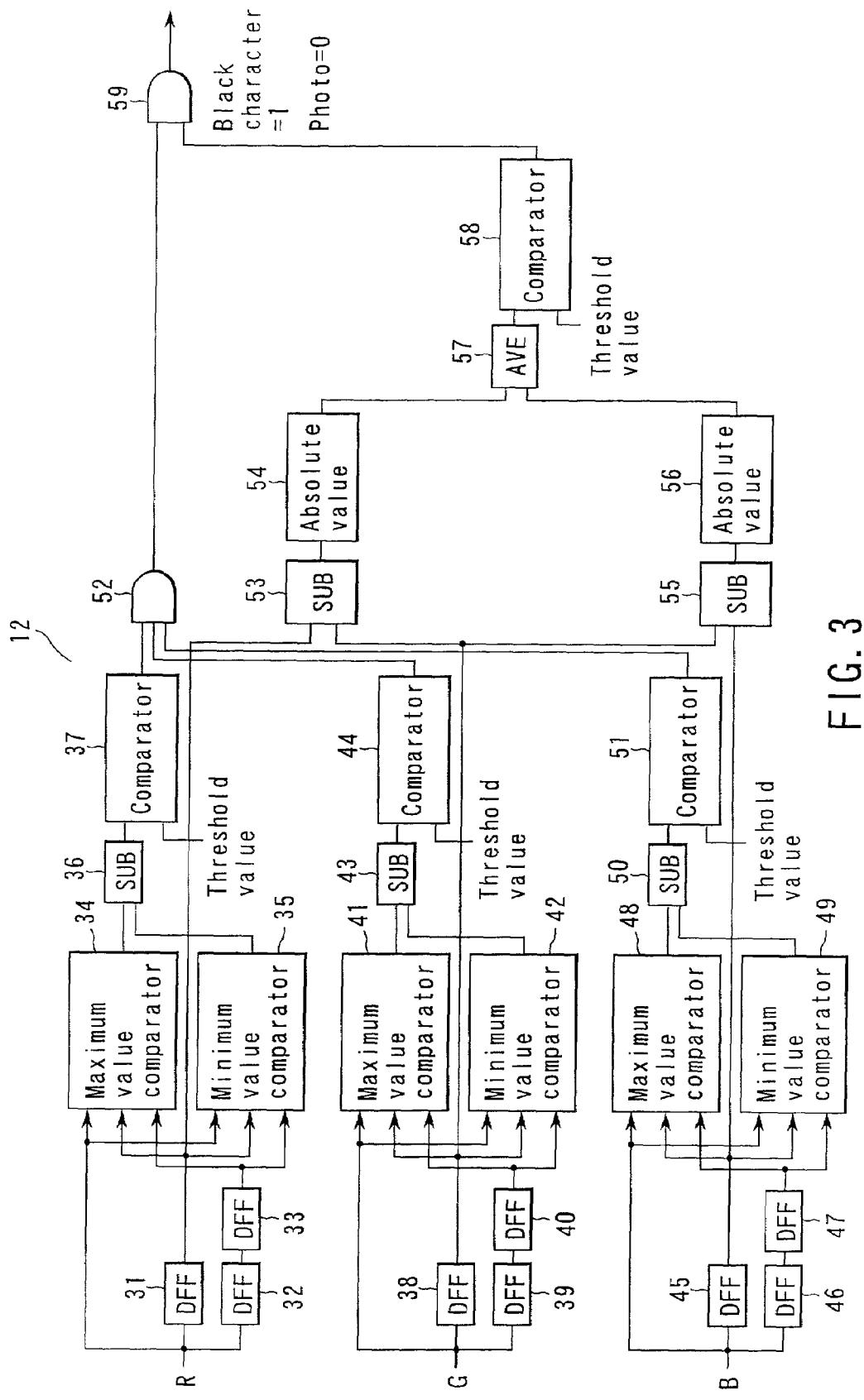
FIG. 3 is a block diagram of a black character identification section in the image compression and decompression apparatus as the first embodiment.
Figure 4:
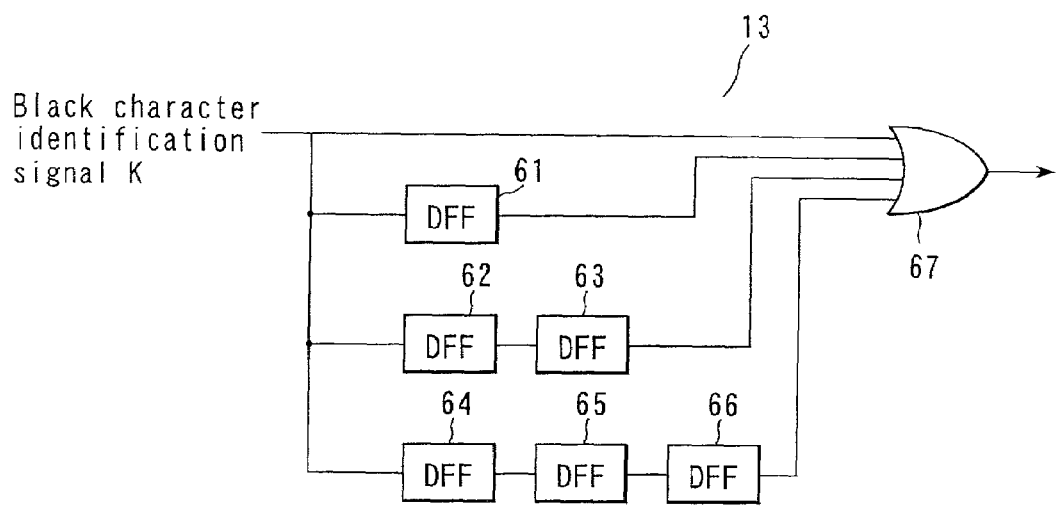
FIG. 4 is a block diagram of a block conversion section in the image compression and decompression apparatus as the first embodiment.
Figure 5:
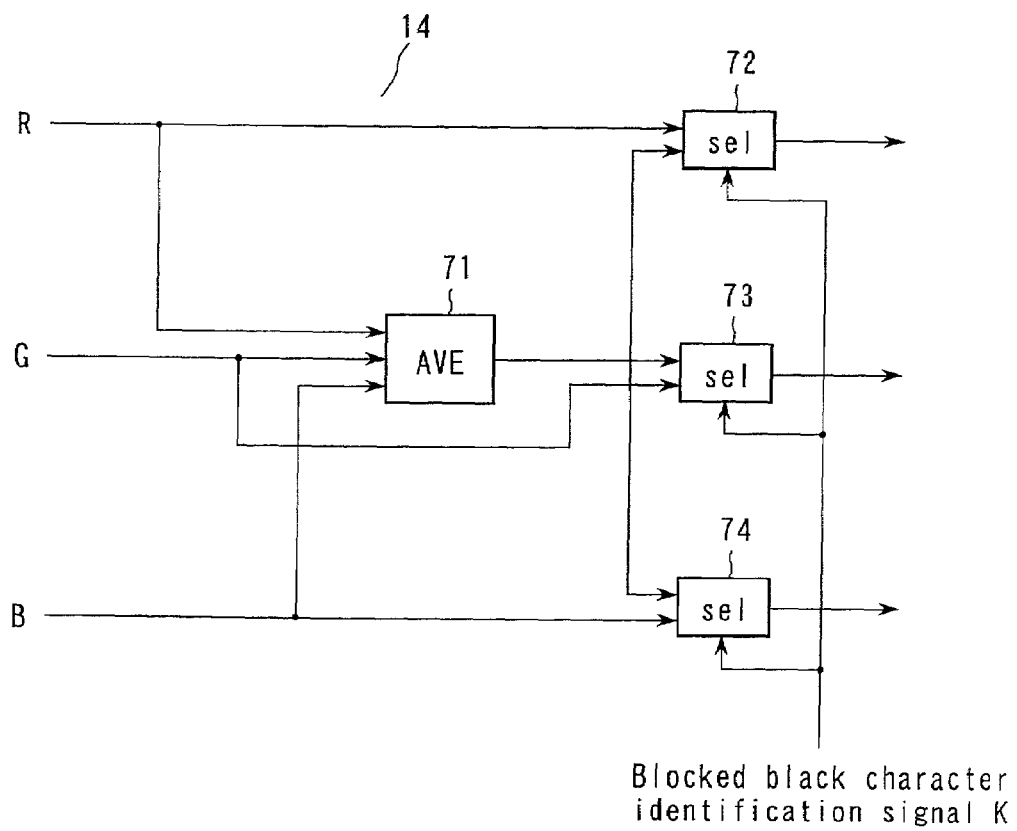
FIG. 5 is a block diagram of a characteristics correction section in the image compression and decompression apparatus as the first embodiment.
Figure 6:
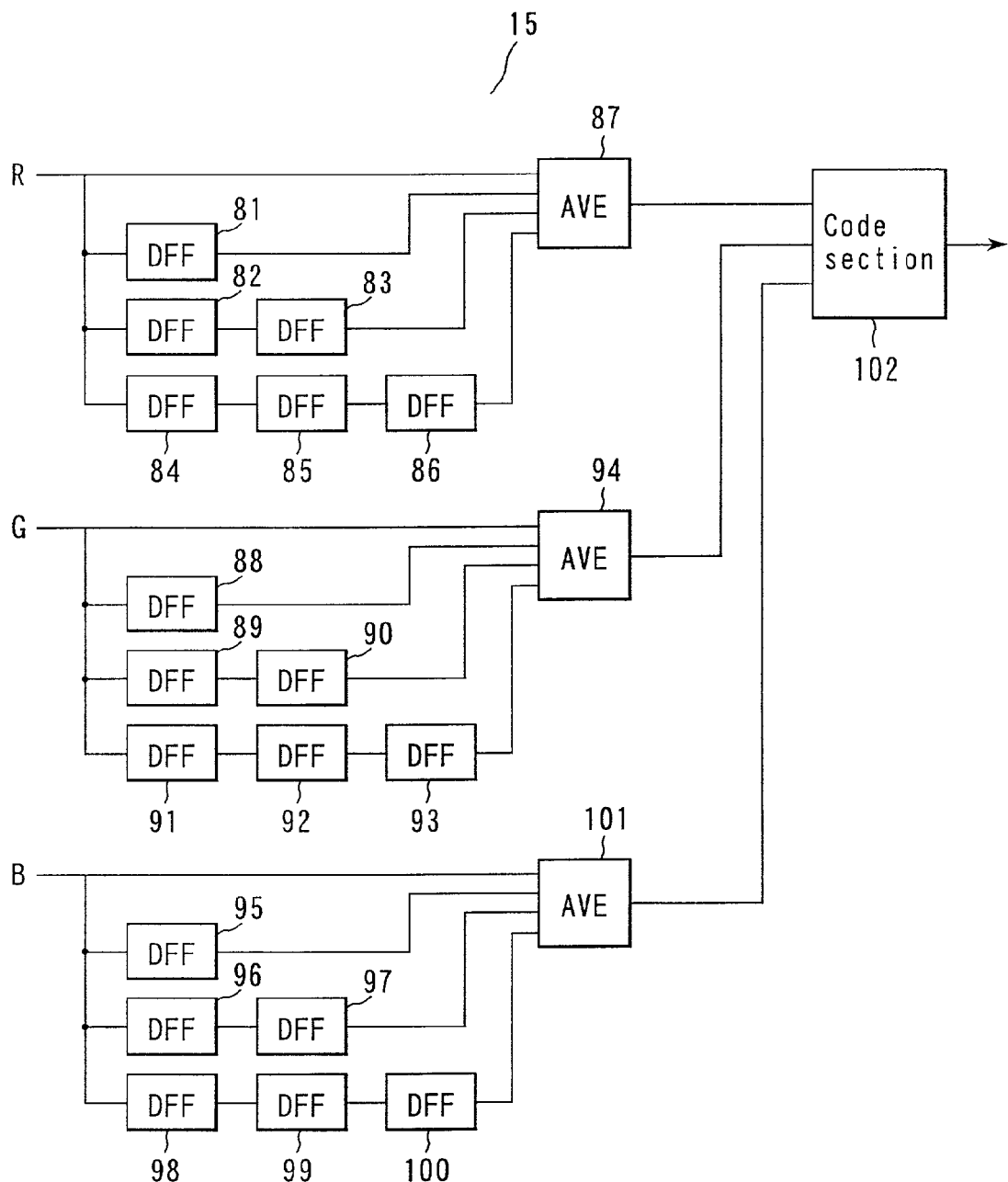
FIG. 6 is a block diagram of a compression section in the image compression and decompression apparatus as the first embodiment.
Figure 7:
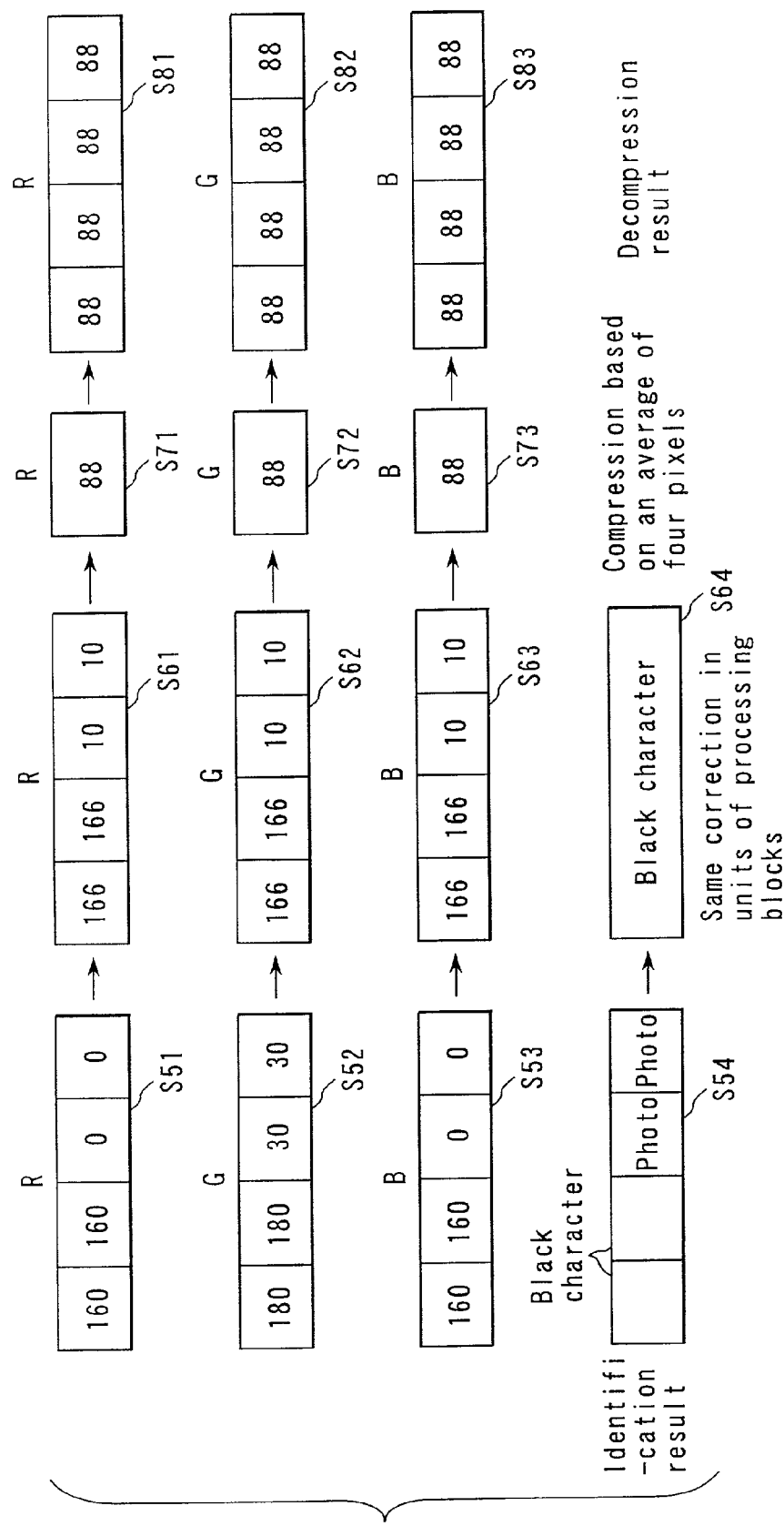
FIG. 7 shows an example of image data compressed and decompressed by the image compression and decompression apparatus as the first embodiment.

The first embodiment provides an image compression and decompression apparatus which performs characteristics correction for given color image information based on an image compression unit (in units of blocks), and then compresses the image. FIG. 1 is a block diagram showing an image compression and decompression apparatus as the first embodiment of the present invention. FIG. 2 explains that image correction of the image compression and decompression apparatus does not follow a compression unit. FIG. 3 is a block diagram of a black character identification section in the image compression and decompression apparatus as the first embodiment. FIG. 4 is a block diagram of a block conversion section in the image compression and decompression apparatus as the first embodiment. FIG. 5 is a block diagram of a characteristics correction section in the image compression and decompression apparatus as the first embodiment. FIG. 6 is a block diagram of a compression section in the image compression and decompression apparatus as the first embodiment. FIG. 7 shows an example of image data compressed and decompressed by the image compression and decompression apparatus as the first embodiment.

In FIG. 1, the image compression and decompression apparatus according to the first embodiment of the present invention comprises a scanner 11, a black character identification section 12, a block conversion section 13, and a characteristics correction section 14. The scanner 11 inputs color images. The black character identification section 12 identifies a black character region from an RGB image signal for an input image. The block conversion section 13 converts this identification signal into a processing unit for an image compression section. The characteristics correction section 14 corrects the black in units of blocks. The image compression and decompression apparatus further comprises an image compression section 15, page memory 20, a hard disk drive (hereafter referred to as HDD) 21, an image decompression section 16, an RGB/CMYK conversion section 17, a halftoning section 18, an output section 19, and a control section 10. The image compression section 15 compresses images in units of blocks. The page memory 20 and the HDD 21 store a compressed signal. The image decompression section 16 decompresses a compressed signal stored in the HDD 21 in units of blocks. The RGB/CMYK conversion section 17 converts an RGB signal into an ink signal. The halftoning section 18 converts a CMYK signal into a signal capable of printout in the output section. The output section 19 prints a signal converted in the halftoning section. The control section 10 controls the entire operation.

With this configuration, the first embodiment processes given color image information in units of blocks during characteristics correction as well as compression and decompression. Each block is converted from the block conversion section 13 as a processing unit. For example, the characteristics correction section 14 achromatizes a black character portion in the color image information by setting RGB signals to the same value based on an identification signal of the black character identification section 12. In this case, it is possible to eliminate image degradation such as coloring even if the compression and decompression is performed thereafter.

The following exemplifies a structure and functions of the black character identification section 12 according to the present invention with reference to FIG. 3. The black character identification section 12 comprises R, G, and B series for receiving RGB signals, respectively. Each of latch circuits 31 to 33, 38 to 40, and 45 to 47 comprises a bypass path and a D-FF (flip-flop). Via paths including one or two stages of these latch circuits, the RGB signals are input to maximum value comparators 34, 41, and 48 and minimum value comparators 35, 42, and 49, respectively. When a pixel is to be processed, an additional pixel is added before and after that pixel. A maximum value and a minimum value for the RGB signals in these three pixels are added to difference circuits 36, 43, and 50. The results are supplied from comparators 37, 44, and 51. Each of the comparators 37, 44, and 51 is compared to a threshold value. The results are collected on an AND circuit 52. Namely, a character region is assumed when a difference between the maximum value and the minimum value is greater than or equal to the threshold value. Difference circuits 53 and 55 compute absolute values 54 and 56 for (R-G) and (G-B). An average value computation circuit 57 generates an average value between the both. When the comparator 58 determines that the average value is smaller than or equal to the threshold value, a black character region is assumed. The determination result is provided as an output from an AND circuit 59 which is supplied with outputs from the AND circuit 52 and the comparator 58. Value 1 is output as a black character region when all of R, G, and B signals indicate a character region and a black region. Otherwise, value 0 is output as a photo region.

The block conversion section 13 can be explained through the use of FIG. 4. A given black character identification signal K is configured by an OR circuit 67 comprising four paths including a bypass path and paths with one, two, and three stages of latch circuits 61 to 66. These four paths correspond to a compression unit (four pixels). This configuration converts a black character identification signal into a signal based on a processing block unit. The conversion result is maintained until the next characteristics correction section 14 completes correction for a compression unit.

The characteristics correction section 14 can be explained through the use of FIG. 5. The RGB signals are supplied to an average value computation circuit 71 and selection elements 72 to 74, respectively. The selection elements 72 to 74 output an average value or RGB values according to a blocked black character identification signal K. This provides black character correction in units of blocks as a compression unit.

The compression section 15 can be explained through the use of FIG. 6. The RGB signals are provided by four paths comprising a bypass path and latch circuits 81 to 86, 88 to 93, and 95 to 100 having one, two, and three stages, and are supplied to average value computation circuits 87, 94, 101, respectively. These four paths correspond to a compression unit (four pixels). Thereafter, each average signal is supplied to a code section 102 for coding.

The image compression and decompression apparatus according to the present invention is thus configured. Using examples of processing image data, the following describes how the image quality deteriorates when a processing unit for the characteristics correction section 14 differs from that for the image compression section 15 and the image decompression section 16. In FIG. 2, RGB signals (S11 to S13) as an example are block-based pixel signals whose identification result is represented by the black character identification section 12 as "black character/black character/photo/photo" (S14). Only the black character pixel becomes an average value "166" for the three signals (S21 to S23) when the block conversion is not performed in the block conversion section 13. In this case, the characteristics correction section performs characteristics correction for representing a pixel identified as a black character to be black corresponding to a pixel-based identification signal. Then, with this state, the image compression section 15 compresses the signals based on an average of four pixels (S31 to S33). However, these values differ from each other because the RGB pixels are subject to different pixel values of the photos. Accordingly, if the RGB signals are decompressed, the RGB values differ (S41 to S43). The black pixel is colored, degrading the image quality.

The image compression and decompression apparatus according to the present invention eliminates this image degradation by performing characteristics correction, image compression and decompression based on the same block unit. This is described below by using an example of specific image data in FIG. 7. Namely, RGB signals (S51 to S53) as color image information each include an identification result of "black character/black character/photo/photo" (S54). The characteristics correction section 14 treats all of these signals as black characters (S64) in order to apply the same correction in units of blocks. Each of the RGB signals is averaged to the same value (S61 to S63). Accordingly, if the next image compression section 15 compresses the signals in units of blocks (S71 to S73), the RGB signals remain unchanged and are compressed and converted. When the image decompression section 16 subsequently decompresses the RGB signals in units of blocks, the RGB signals (S81 to S83) maintain the same values though a character edge is blurred. The black character's color is ensured, preventing the image quality from degrading with respect to coloring.

This example performs black character correction if the processing block contains just a single black character identification signal. The characteristics correction and the image compression and decompression in units of blocks according to the present invention are not limited thereto. Various modifications may be made according to arrangement of pixel values and other identification signals, associated pixel values, and identification results. While the above-mentioned example uses averaging as a compression method, the present invention is not limited thereto. Various processes may be applicable. Likewise, when an image is compressed and decompressed, the present invention ensures effects of characteristics correction with respect to characteristics of the color image information.

<Second Embodiment>

Figure 8:
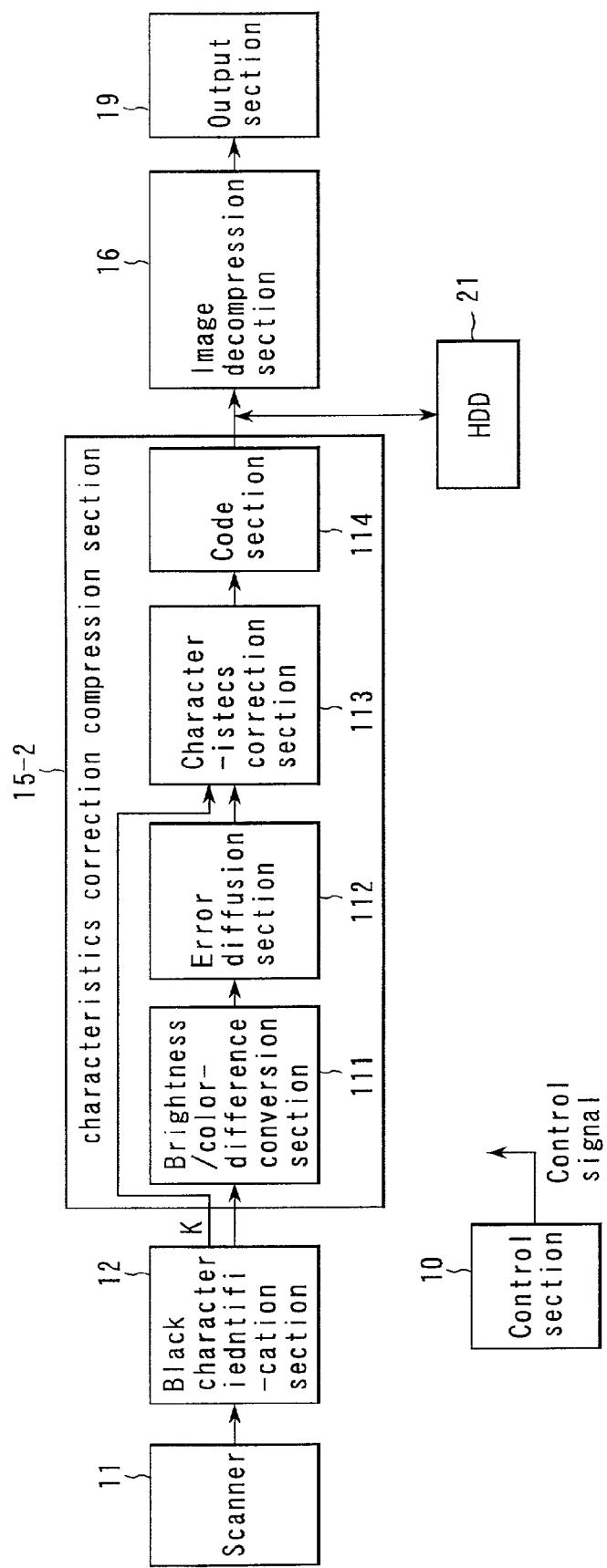
FIG. 8 is a block diagram showing an image compression and decompression apparatus as a second embodiment according to the present invention.
Figure 9:
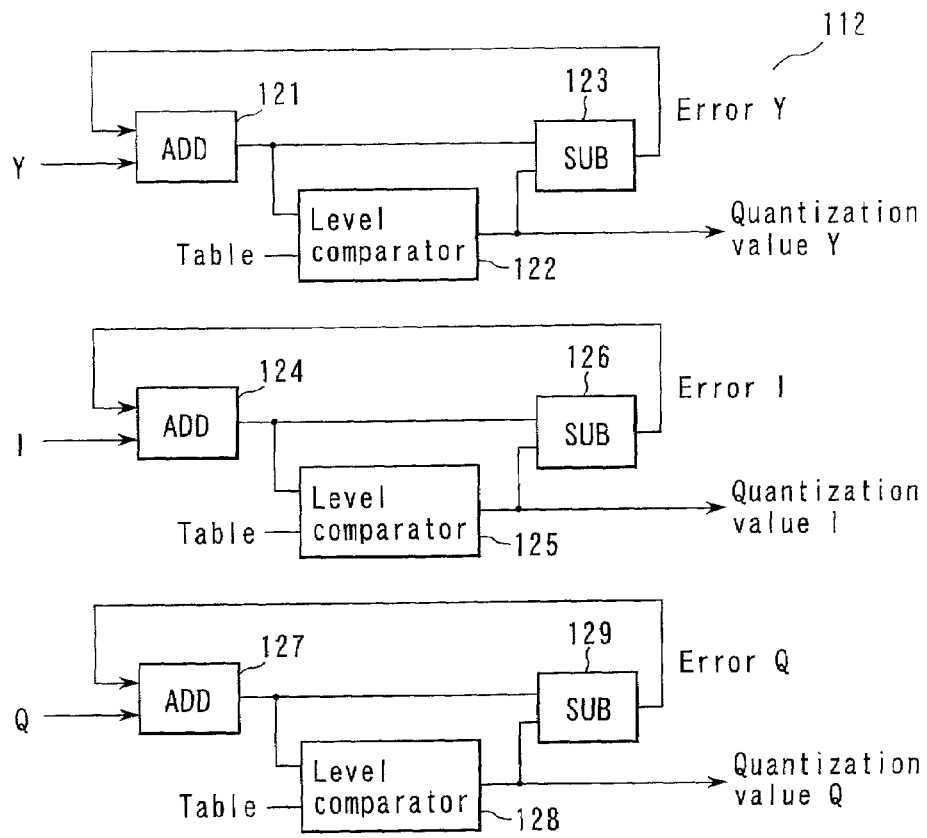
FIG. 9 is a block diagram of an error diffusion section in the image compression and decompression apparatus as the second embodiment according to the present invention.
Figure 11:
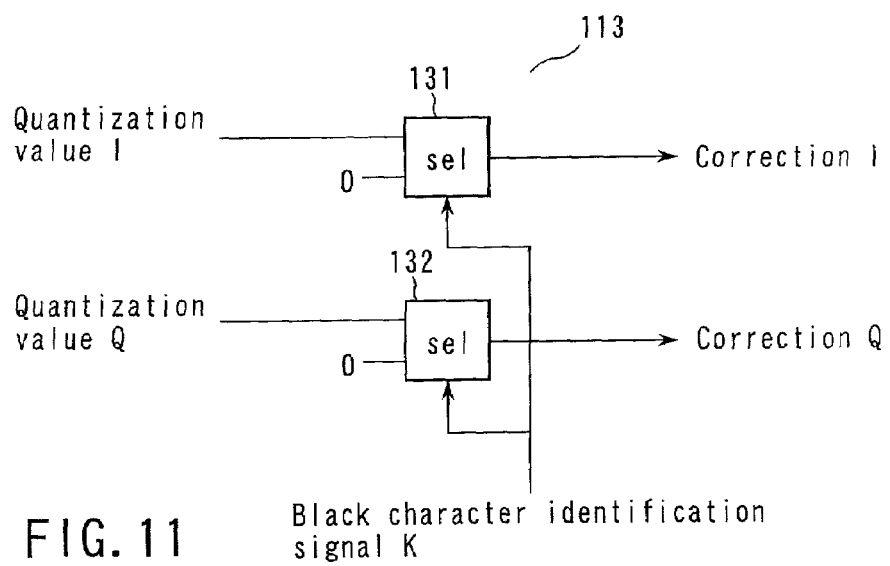
FIG. 11 is a block diagram of a characteristics correction section in the image compression and decompression apparatus as the second embodiment.
Figure 12:
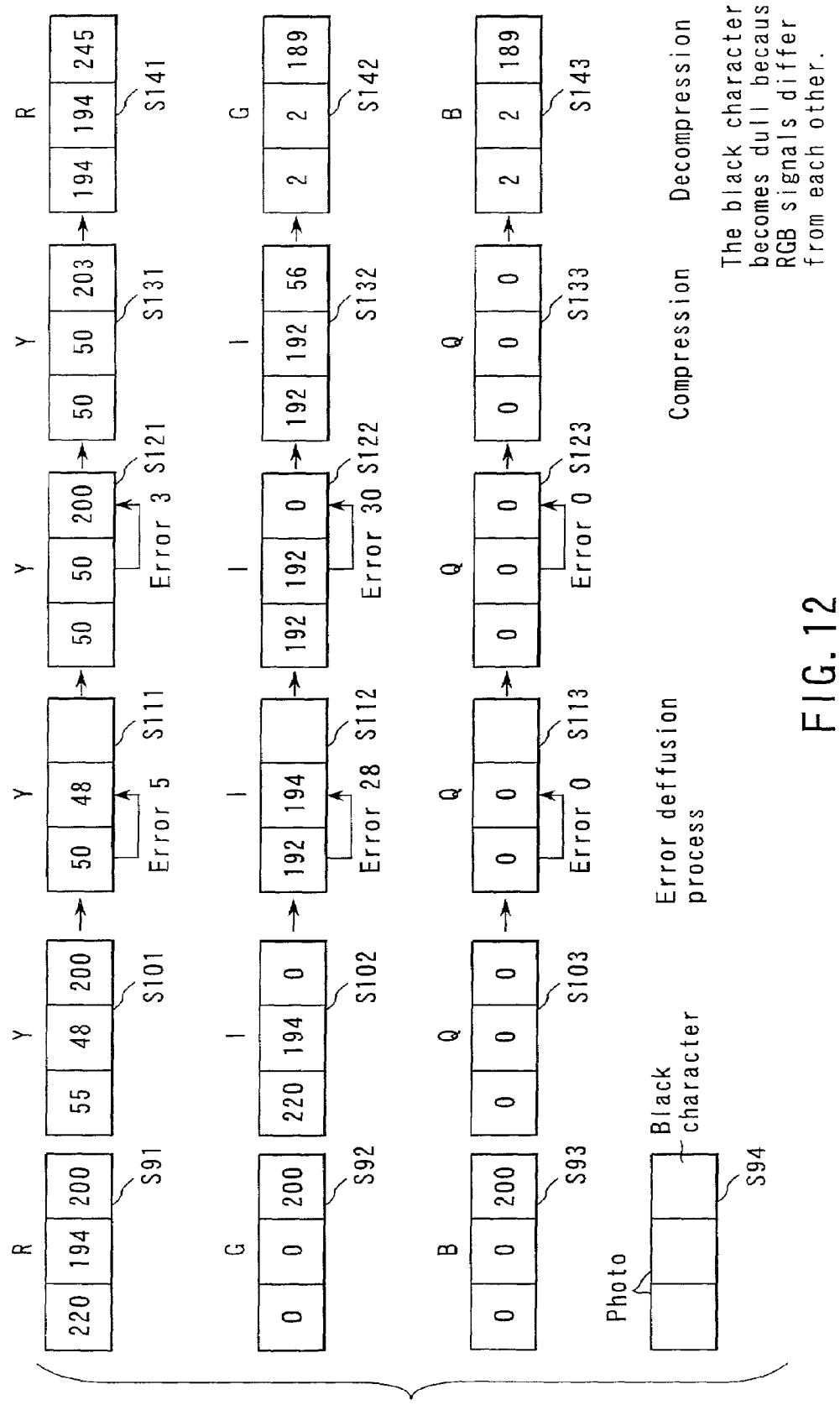
FIG. 12 illustrates a problem when there is not provided the characteristics correction section in the image compression and decompression apparatus as the second embodiment.
Figure 13:
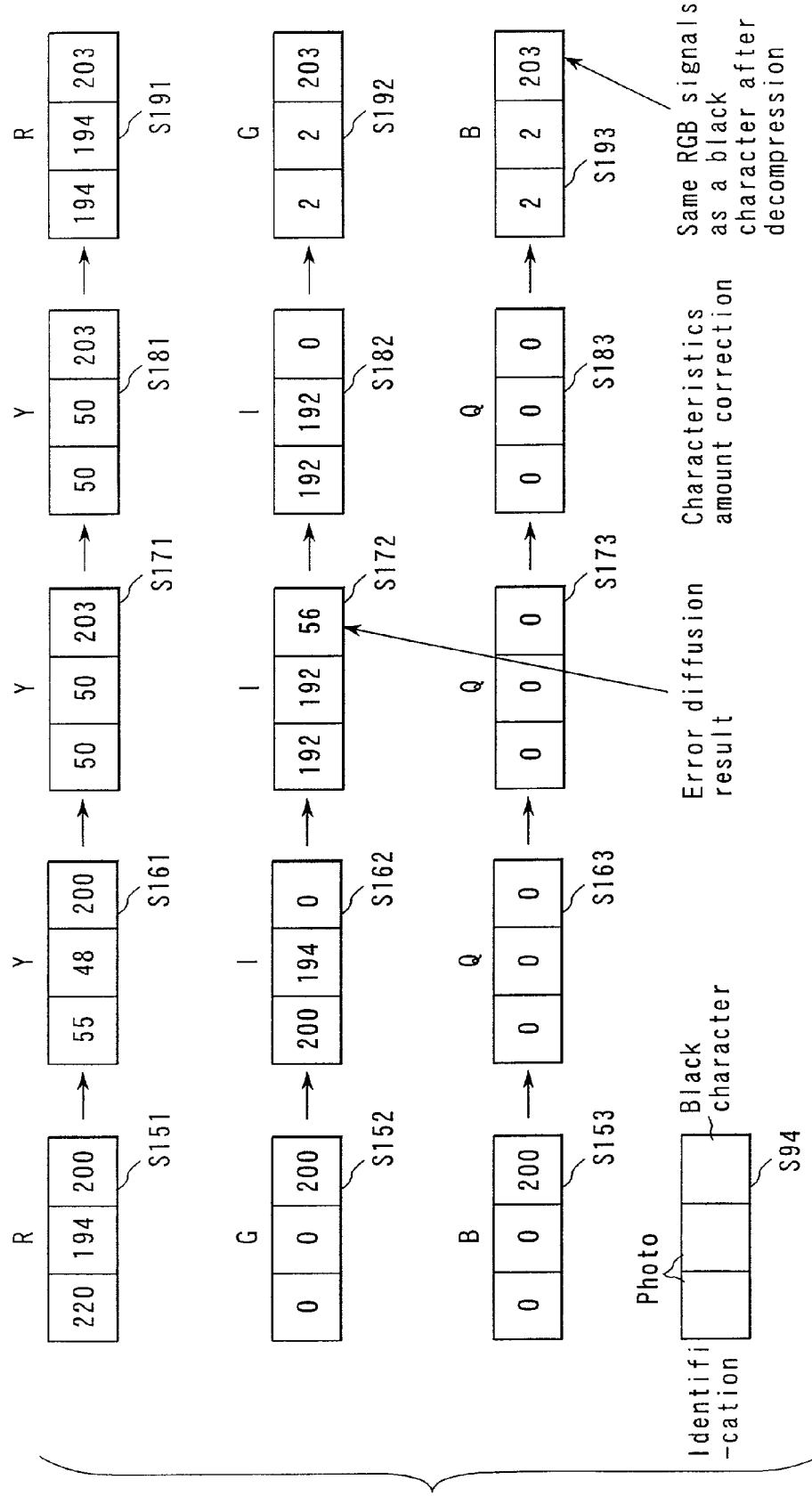
FIG. 13 illustrates a case where there is provided the characteristics correction section in the image compression and decompression apparatus as the second embodiment.

The second embodiment uses the image compression and decompression apparatus to perform characteristics correction during compression. This enables desired characteristics correction without effects of the compression. FIG. 8 is a block diagram showing an image compression and decompression apparatus as the second embodiment according to the present invention. FIG. 9 is a block diagram of an error diffusion section in the image compression and decompression apparatus. FIG. 10A shows a brightness table for the image compression and decompression apparatus. FIG. 10B shows a color difference table. FIG. 11 diagrams a characteristics correction section in the image compression and decompression apparatus. FIG. 12 illustrates a problem when there is not provided the characteristics correction section. FIG. 13 illustrates a case where there is provided the characteristics correction section in the image compression and decompression apparatus.

The image compression and decompression apparatus according to the second embodiment can be explained with reference to FIG. 8. The image compression and decompression apparatus comprises a scanner 11, a black character identification section 12, a characteristics correction compression section 15-2, an HDD 21, an image decompression section 16, an output section 19, and a control section 10. The scanner 11 inputs color image information. The black character identification section 12 identifies a black character region in the color image information. The characteristics correction compression section 15-2 corrects and compresses a color image by using an identification result from the black character identification section. The HDD 21 stores the compression signal. The image decompression section 16 decompresses the compressed image information stored in the compression signal. The output section 19 includes a printer etc. The control section 10 controls the entire operation.

The characteristics correction compression section 15-2 comprises a brightness/color-difference conversion section 111, an error diffusion section 112, a characteristics correction section 113, and a code section 114. The brightness/color-difference conversion section 111 converts RGB image signals into brightness/color-difference signals. The error diffusion section 112 diffuses an error in the brightness/color-difference signal connected thereto. Using an identification result from the black character identification section, the characteristics correction section 113 corrects characteristics in the color image information supplied from the error diffusion section 112. The code section 114 encodes a correction result and converts it into a compression signal.

Figure 25:
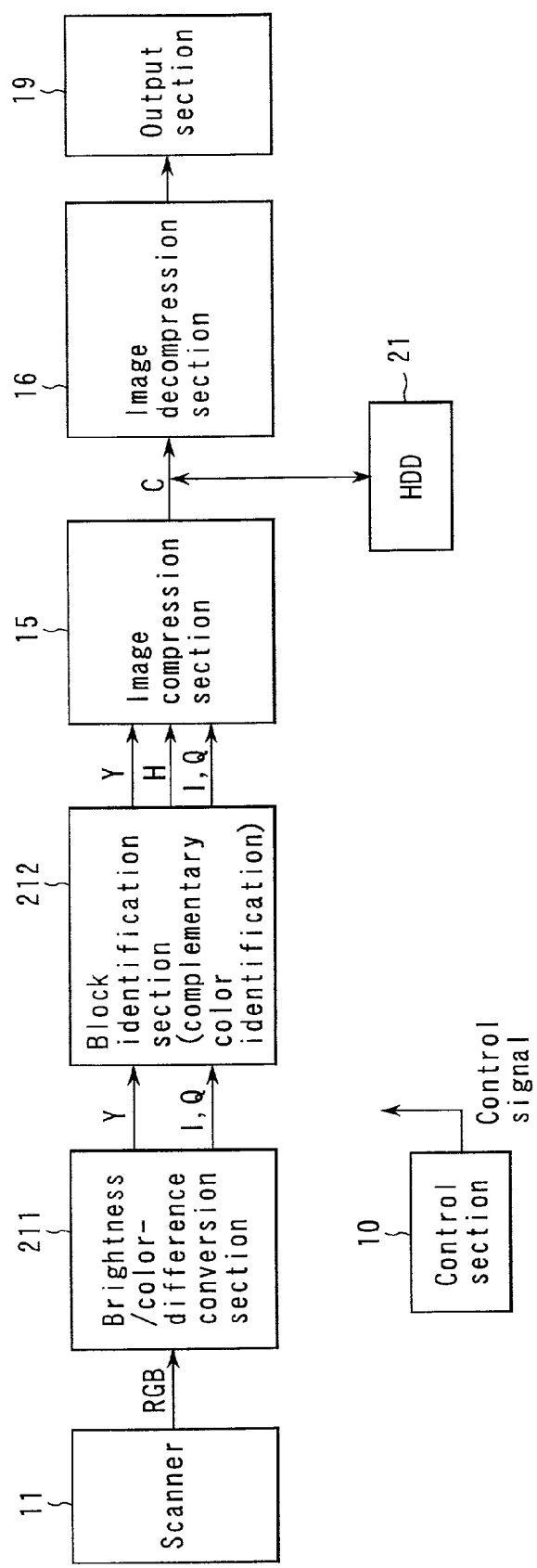
FIG. 25 is a block diagram showing an image compression apparatus as a sixth embodiment according to the present invention.

The black character identification section 12 has the same configuration as shown in FIG. 3. The brightness/color-difference conversion section 111 has the same configuration as shown in FIG. 25. A brightness/color-difference signal makes degradation not so remarkable if a compression rate for the color-difference signal is higher than that for the brightness signal. Images can be compressed efficiently by converting RGB signals to brightness/color-difference signals.

The error diffusion section 112 can be explained through the use of FIG. 9. In the error diffusion section 112, brightness/color-difference signals YIQ are supplied to adders 121, 124, and 127, respectively. The outputs and tables are supplied to level comparators 122, 125, and 128. Outputs from the level comparators 122, 125, and 128 are supplied to difference circuits 123, 126, and 129. The output results are again supplied to adders 121, 124, and 127. With this configuration, the error diffusion section 112 repeatedly propagates an error between a quantized processing pixel (original image value) and a quantization value to nearby pixels for eliminating a visual difference from the original image by using a small number of pixels around the pixel to be processed. Since the quantization decreases the number of states, the code section is capable of compression.

FIG. 9 shows the concept of diffusing errors to adjacent pixels. The level comparator is used to determine a quantization level and outputs the corresponding value as a quantization value. A differentiator computes an error between the relevant pixel value and the quantization value and propagates the error to an adjacent pixel.

The brightness table in FIG. 10A shows that a brightness signal Y is quantized to 16 value. Similarly, the color difference table in FIG. 10B shows that each of color difference signals I and Q is quantized to 9 values.

The characteristics correction section 113 can be explained through the use of FIG. 11. Quantization value I of the color difference signal is supplied to the selection element 131. Quantization value Q of the color difference signal is supplied to the selection element 132. black character identification signal K is supplied to selection elements 131 and 132. A quantization value is selected according to a value of black character identification signal K. For example, "0" is selected for a black character.

The image compression and decompression apparatus according to the second embodiment of the present invention has the above-mentioned configuration as an example. FIG. 12 is used for explaining a problem when no characteristics correction is provided during the compression in the second embodiment. In FIG. 12, each of RGB signals (S91 to S93) is color image information identified as "photo/photo/black character" (S94). The brightness/color-difference conversion section 111 converts the RGB signals to YIQ signals (S101 to S103). Further, the brightness table Y and the color difference table IQ are used for error diffusion. Errors are sequentially diffused from YIQ signals (S111 to S113) to those S121 to S123, and then S131 to S133. The YIQ signals are compressed and decompressed to finally yield RGB signals (S141 to S143). When pixels with the same RGB signal value are identified as a black character before compression, these pixels are colored if no characteristics correction is performed. This is because the RGB values differ from each other after the compression and decompression, resulting in image quality degradation.

As shown in FIG. 13, the image compression and decompression apparatus according to the second embodiment provides given RGB signals (S151 to S153) identified as "photo/photo/black character" (S154). The brightness/color-difference conversion section 111 converts the RGB signals to YIQ signals (S161 to S163). The error diffusion section 112 applies error diffusion to YIQ signals (S161 to S163) to generate brightness/color-difference signals (S171 to S173).

The characteristics correction section 113 corrects the characteristics amount (S191 to S193) so that the brightness/color-difference signal corresponding to a black character identification signal becomes a black character after decompression. Namely, when the characteristics correction according to the present invention is performed during compression, the black character region maintains the same RGB values and ensures the black character characteristics after decompression. Accordingly, it is possible to prevent image quality degradation even after image compression and decompression.

While this embodiment uses black character identification for sequential correction in units of pixels, it may be preferable to use a different identification signal based on adjacent identification results, pixel values, characteristics amounts during compression, etc. While the embodiment uses the error diffusion as a compression method, the compression method according to the second embodiment of the present invention is not limited thereto. The characteristics amount may be based on brightness components as well as color difference components. For example, it is apparent that the above-mentioned effects are also valid when frequency components are used for the orthogonal transformation.

The second embodiment of the present invention corrects a property characteristic of the identification signal during compression, preventing deterioration due to the property characteristic to an image identified by the compression. Further, it is possible to prevent image quality deterioration by achromatizing a black character after converting the characteristics amount of the compression or white-correcting a white region which changes to non-white due to the characteristics amount conversion.

<Third Embodiment>

Figure 14:
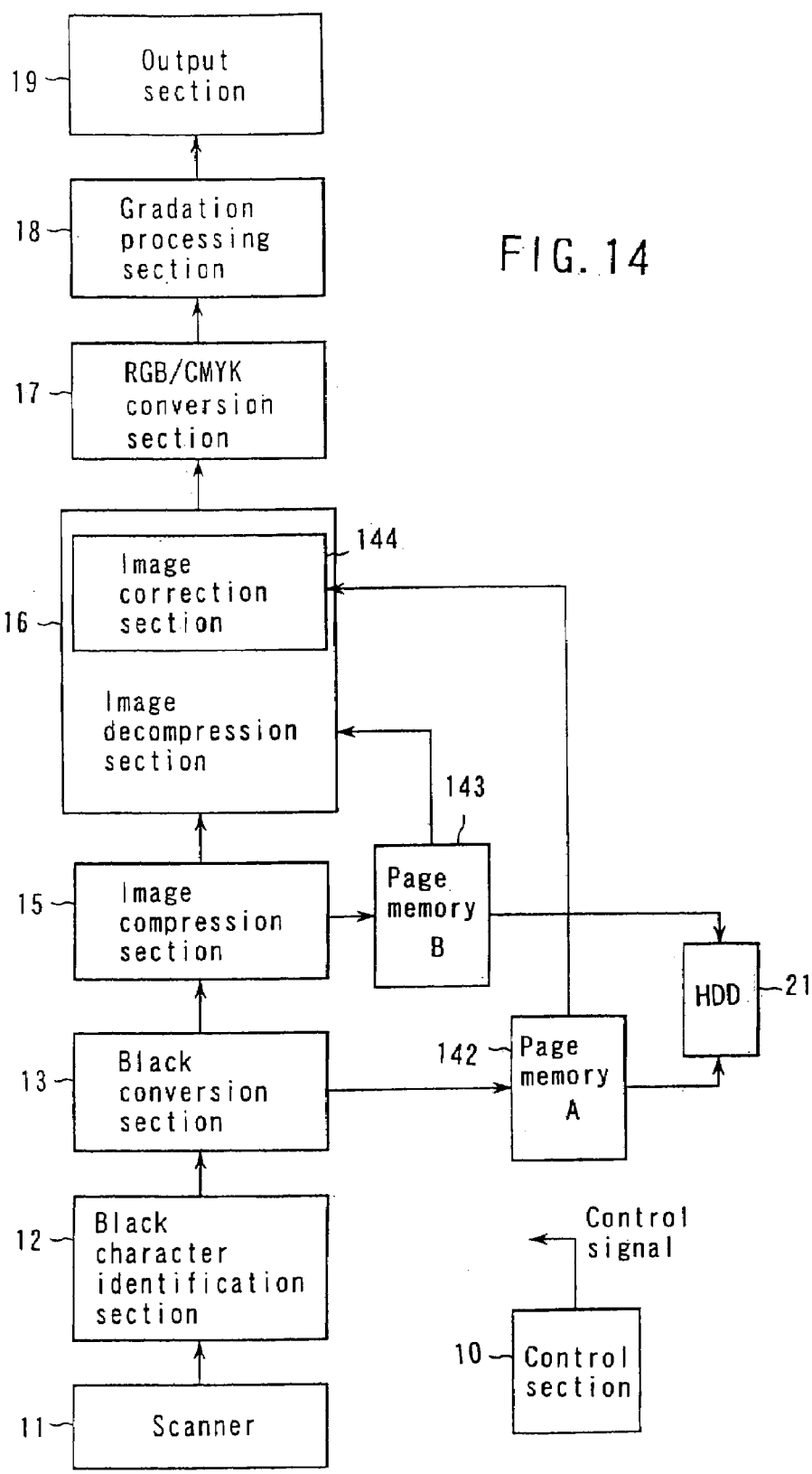
FIG. 14 is a block diagram showing an image compression and decompression apparatus as a third embodiment according to the present invention.
Figure 15:
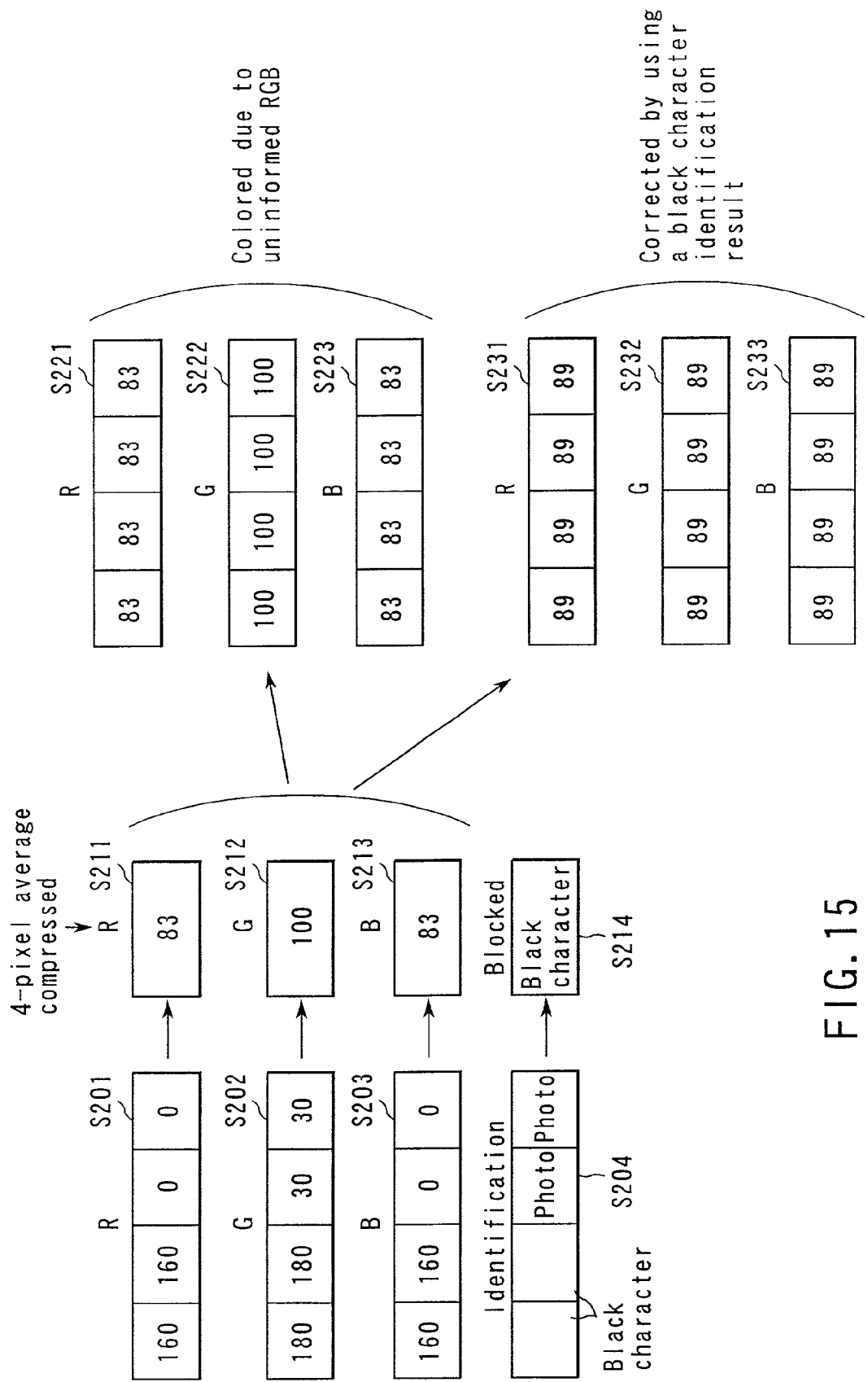
FIG. 15 depicts processing of the image compression and decompression apparatus as the third embodiment.

In the third embodiment, the image compression and decompression apparatus performs a characteristics correction during decompression. This enables desired characteristics correction independently of effects of the compression and decompression. FIG. 14 is a block diagram showing the image compression and decompression apparatus as the third embodiment according to the present invention. FIG. 15 depicts processing of the image compression and decompression apparatus.

The image compression and decompression apparatus according to the third embodiment can be explained through the use of FIG. 14. The basic configuration is almost the same as that shown in FIG. 1. Differences are as follows. Page memory A 142 is used as a storage area dedicated to blocked identification signals. Page memory B 143 is used as a storage area for compressed images. Further, an image correction section 144 is provided in the image decompression section 16.

Operations of this embodiment can be explained with reference to FIG. 15. Given RGB signals (S201 to S204) in FIG. 15 are compressed in the compression section 15 (S211 to S213). When the image decompression section 16 performs decompression, the image correction section included therein corrects an image by using a black character identification result (S231 to S233). This ensures color for a black character despite the compression and decompression, preventing image quality degradation. For example, this correction section during decompression can be implemented by using the processing section in FIG. 5 during decompression.

If the characteristics correction according to the present invention is not performed during decompression, the RGB signals differ from each other (S221 to S223). Consequently, unnecessary color is applied to the corresponding image, causing image quality degradation.

The third embodiment can prevent image quality degradation occurring in compression on the conventional apparatus by correcting a property characteristic of the identification signal during decompression. For example, a character region is emphasized with respect to a DCT high frequency component and then is decompressed. A black character region is replaced by an achromatic code and then is decompressed. By performing the characteristics correction during decoding, it is possible to perform characteristics corrections according to the usage and more effectively prevent image quality degradation.

<Fourth Embodiment>

Like the third embodiment, the fourth embodiment performs image characteristics correction during decoding. However, the fourth embodiment uses not only black characters, but also black and color characters for identification. An identification signal is stored in page memory. Compression and identification results are read for decompression.

Figure 16:
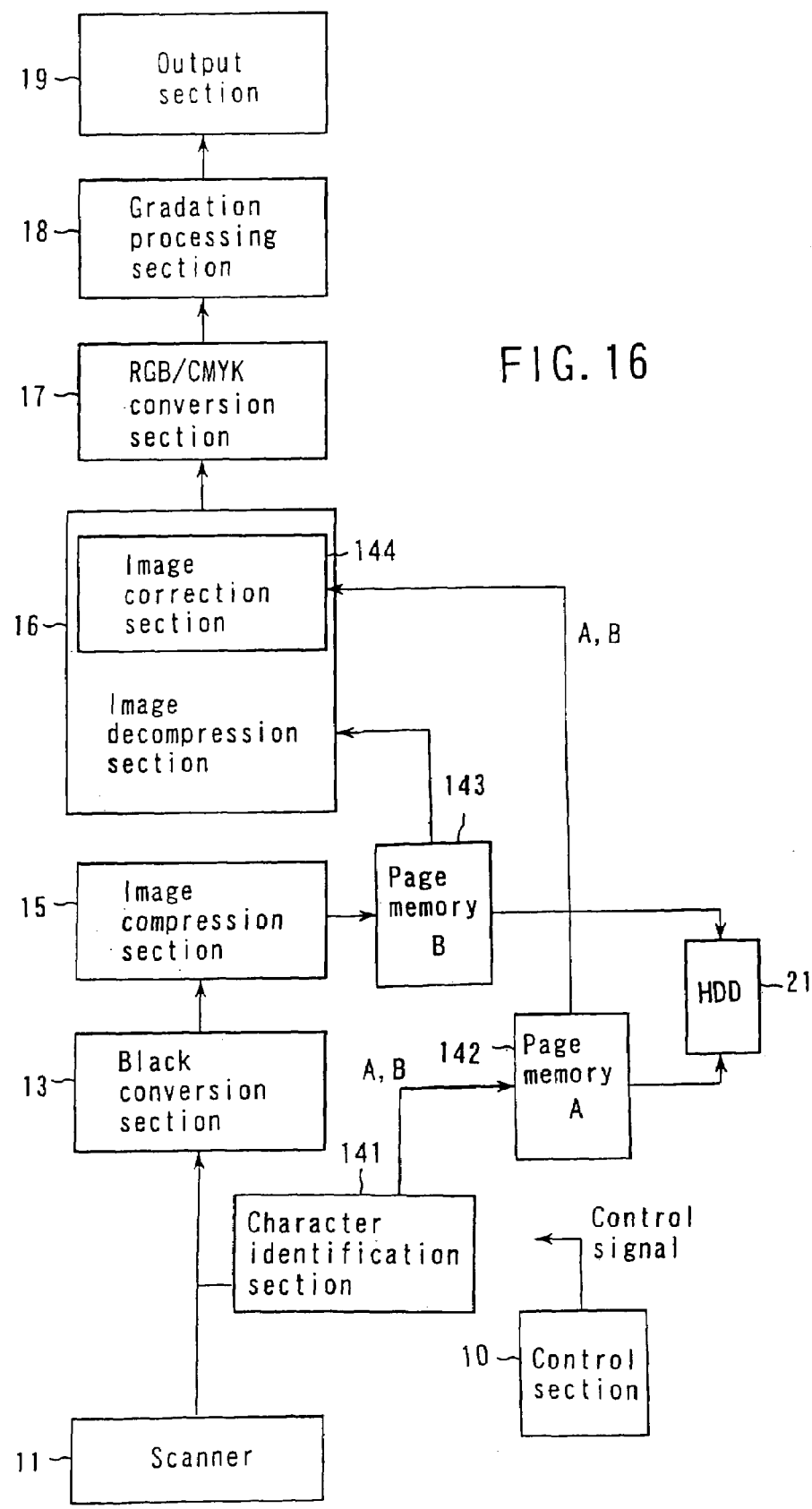
FIG. 16 is a block diagram showing an image compression and decompression apparatus as a fourth embodiment according to the present invention.
Figure 17:
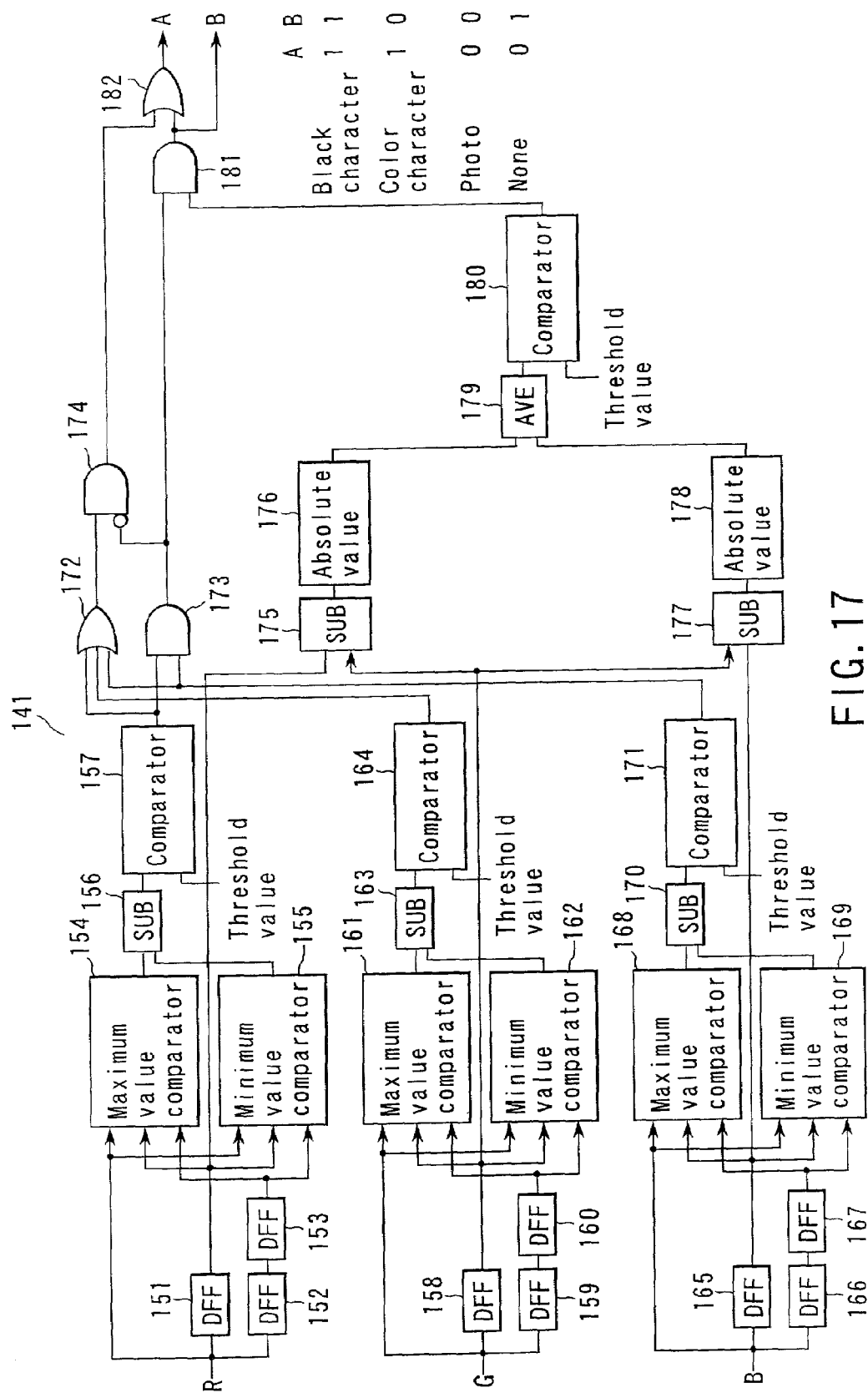
FIG. 17 is a block diagram showing a character identification section in the image compression and decompression apparatus as the fourth embodiment.

Unlike in FIG. 14, the image compression and decompression apparatus according to the fourth embodiment uses a character identification section 141 as shown in FIG. 16. FIG. 17 shows a configuration example of the character identification section 141. The black character identification section 141 receives RGB signals based on R-series, G-series, and B-series. Corresponding to each of these series, RGB signals are input to maximum value comparators 154, 161, and 168 and minimum value comparators 155, 162, and 169 via paths including one stage and two stages of latch circuits 151 to 153, 158 to 160, and 165 to 167 comprising bypass paths and D-FFs (flip-flops). When a pixel is to be processed, an additional pixel is added before and after that pixel. A maximum value and a minimum value for the RGB signals in these three pixels are added to difference circuits 156, 163, and 170. The results are supplied from comparators 157, 164, and 171. The comparators 157, 164, and 171 are compared to a threshold value. The results are collected on an OR circuit 172. An average value computation circuit 179 is used to find an average value for difference circuits 175 and 177 and absolute values 176 and 178. When a comparator 180 determines that the average value is smaller than or equal to the threshold value, a black region is assumed. The result is supplied to an AND circuit 181 and an OR circuit 182 together with results from an AND circuit 173 and a NAND circuit 174, and is output as signals A and B. The signals A and B provides an identification result as black character (1,1), color character (1,0), photo (0,0), and none (0,1), respectively.

Figure 18:
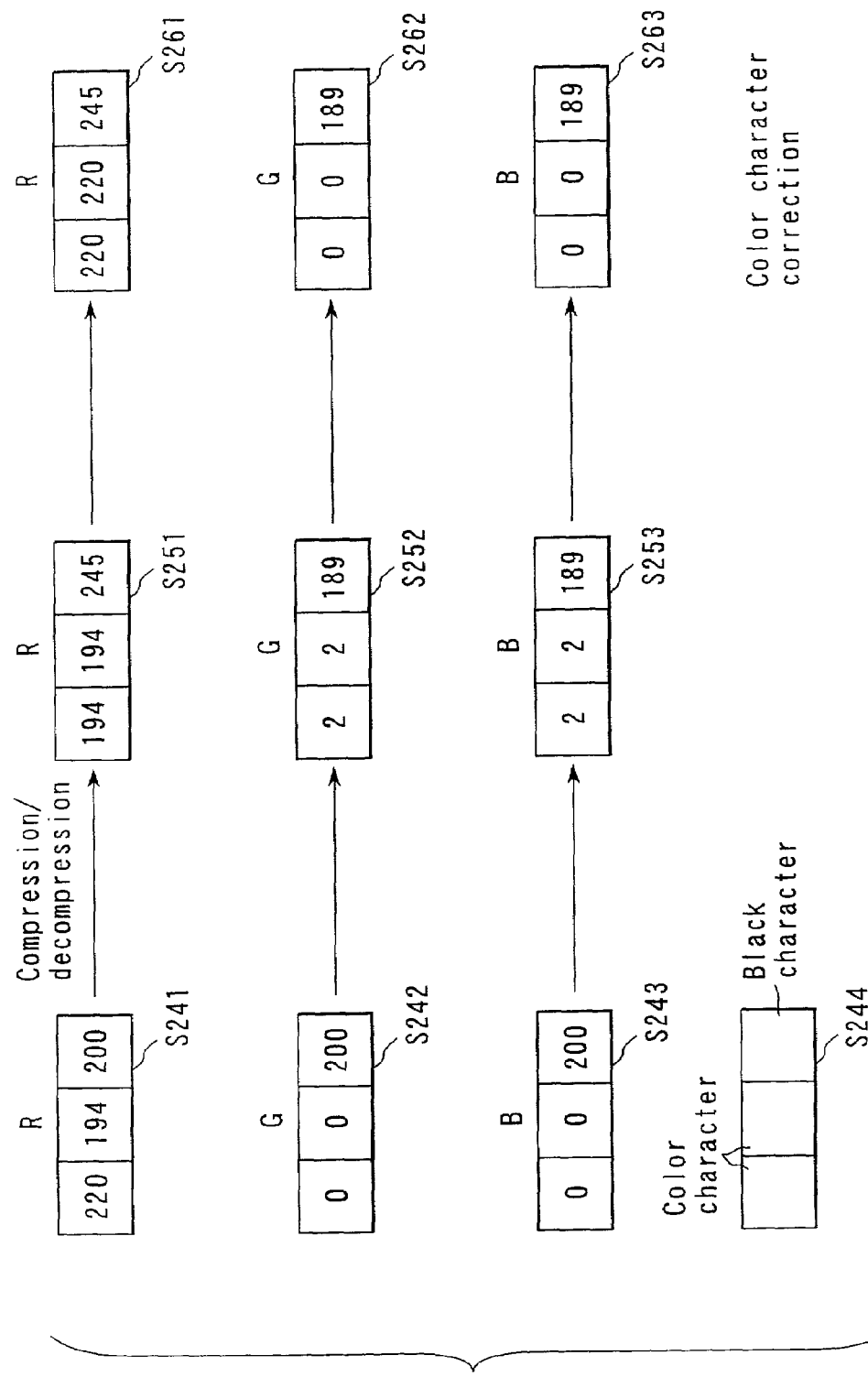
FIG. 18 depicts processing of the image compression and decompression apparatus as the fourth embodiment.

FIG. 18 depicts processing of the image compression and decompression apparatus according to the fourth embodiment by using an example of image data. When RGB signals (S241 to S244) are compressed and decompressed, resulting image signals (S251 to S253) provide degraded image quality. The color character becomes slightly dull (G, B=2). The chroma decreases. Namely R becomes lower than the original image. However, the image correction section 144 performs correction according to an identification signal from the character identification section 141. By using the information that the pixel to be processed is a color character, the image correction section 144 highlights R (S261) and attenuates G and B (S262, S263) to increase the chroma.

Figure 19:
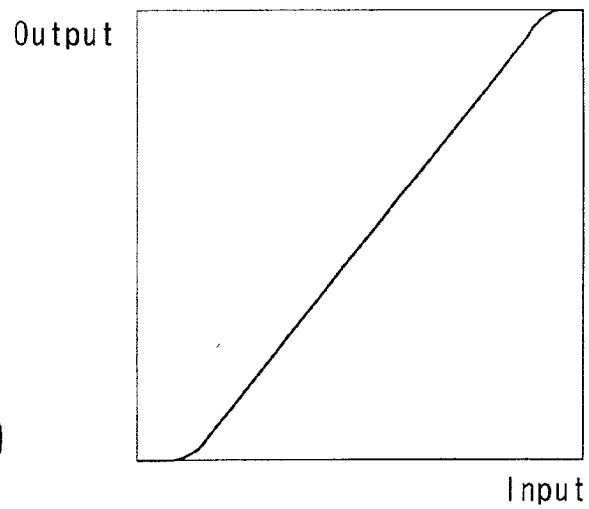
FIG. 19 is a graph showing processing of a correction section in the image compression and decompression apparatus as the fourth embodiment.

As shown in FIG. 19, for example, the image correction section 144 slightly strengthens the highlight and slightly weakens the high density. This causes the original image to approximate to pure color. Dullness is removed from data with a high chroma. In this example, the highlight is mixed with other colors, decreasing the high density level. Further, color image information does not change in pale hues. Pure color is extensively used for information such as a character which needs to be reproduced clearly. Such information can be reproduced with high image quality by correcting the chroma information. Namely, the fourth embodiment of the present invention corrects chroma by using an identification signal from the identification section 141 during decompression, enabling the correction of color dullness.

<Fifth Embodiment>

The fifth embodiment provides compression mode as a method of compressing color image information and its identification signal. This embodiment provides an image compression and decompression apparatus capable of appropriately compressing the color image information and the identification signal by means of an optimal compression method according to types and uses of color image information to be handled for allowing effective processing.

Figure 20:
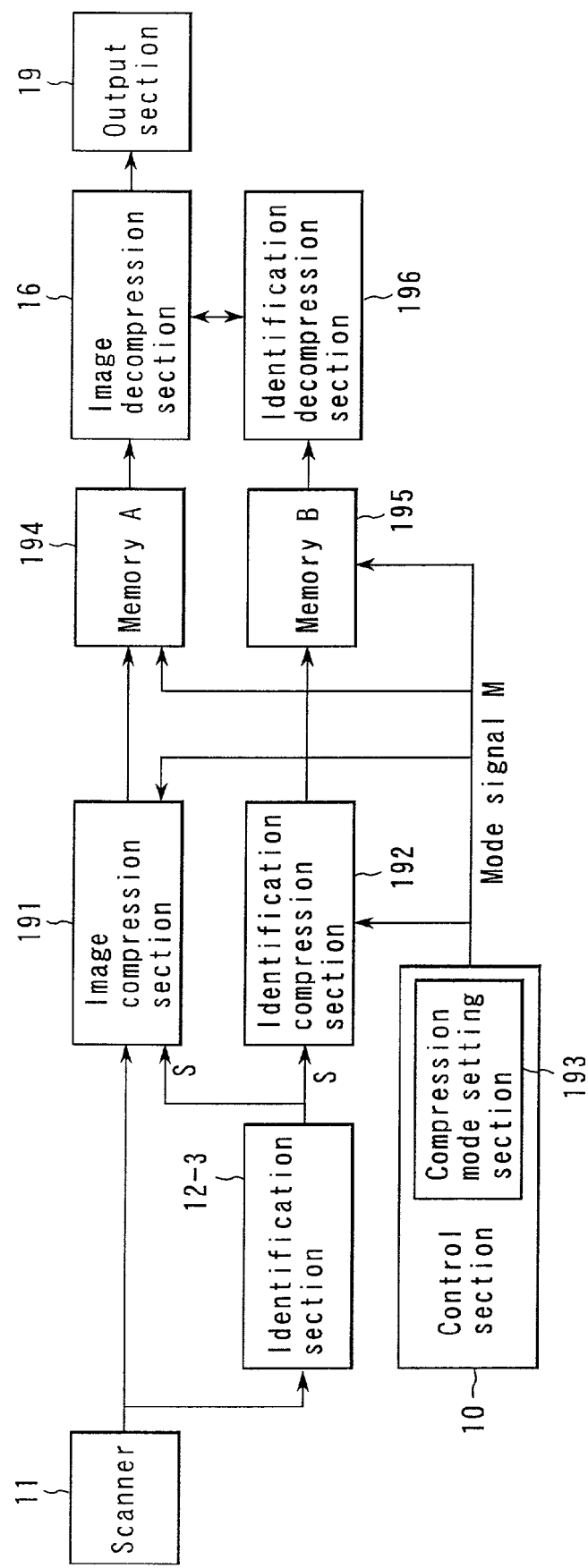
FIG. 20 is a block diagram showing an image compression apparatus as a fifth embodiment according to the present invention.

A configuration example of the fifth embodiment can be explained with reference to FIG. 20. This configuration comprises a scanner 11, an identification section 12-3, an image compression section 191, and an identification compression section 192. The scanner 11 inputs images. The identification section 12-3 identifies the color image information. The image compression section 191 compresses image signals. The identification compression section 192 compresses identification signals. Further, the apparatus comprises memory A 194, memory B 195, an image decompression section 16, an identification decoding section 196, an identification decoding section, and an output section 19. The memory A 194 stores an image signal compressed in the image compression section 191. The memory B 195 stores an image signal compressed in the identification compression section 192. The image decompression section 16 decompresses compressed image information stored in the memory A 194. The identification decoding section 196 decompresses compressed image information stored in the memory B 195. The output section 19 includes a printer, etc. In addition, the control section 10 manages the entire operation and contains a compression mode setting section 193 for specifying methods of using identification signals and compressing these signals.

Figure 21:
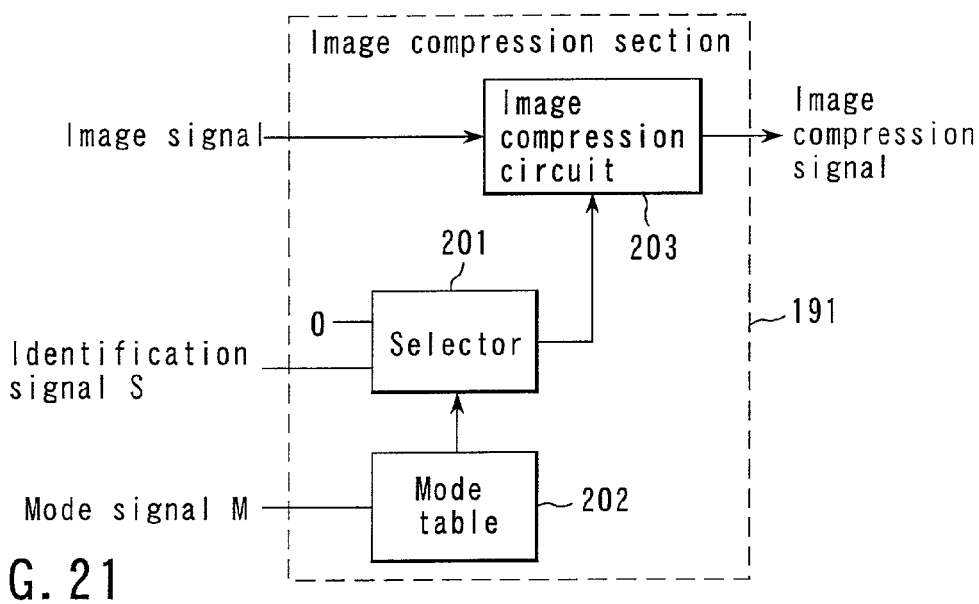
FIG. 21 is a block diagram showing an image compression section in the image compression apparatus as the fifth embodiment.

FIG. 21 shows a configuration example of the image compression section 191. The image compression section 191 uses a selector 201 to input identification signal S and select an operation to be performed according to states of identification signal S. The selector 201 selects a signal input to an image compression circuit 203 whether the signal is identification signal S or a fixed value ("0" in this example) according to a mode table 202 for images. This table is determined by mode signal M supplied from the compression mode setting section 193.

When "0" is selected from the mode table 202, the same processing takes place by ignoring identification signal S. When identification signal S is selected, this signal is used to change the processing accordingly.

Figure 22:
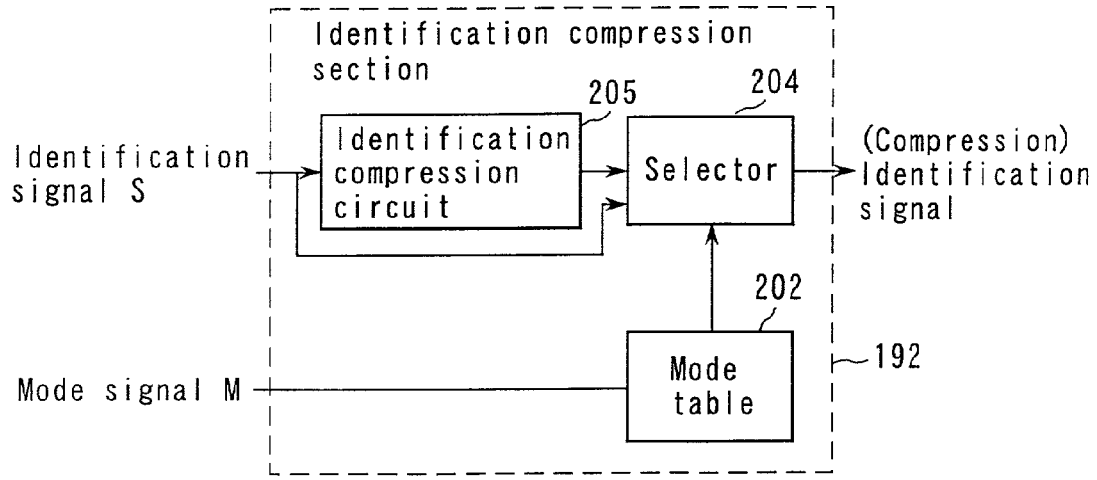
FIG. 22 is a block diagram showing an identification compression section in the image compression apparatus as the fifth embodiment.

Further, FIG. 22 shows a configuration example of the identification compression section 192. This section includes an identification compression circuit 205 and a selector 204. The identification compression circuit 205 is supplied with identification signal S from the image identification section 12-3. The selector 204 connects this output with identification signal S. The image mode table 202 is determined by mode signal M supplied from the compression mode setting section 193. A signal from this table is supplied to the selector 204. The selector makes selection according to mode signal M and outputs identification signal S or a compression signal for identification signal S.

Figures 23, 24:
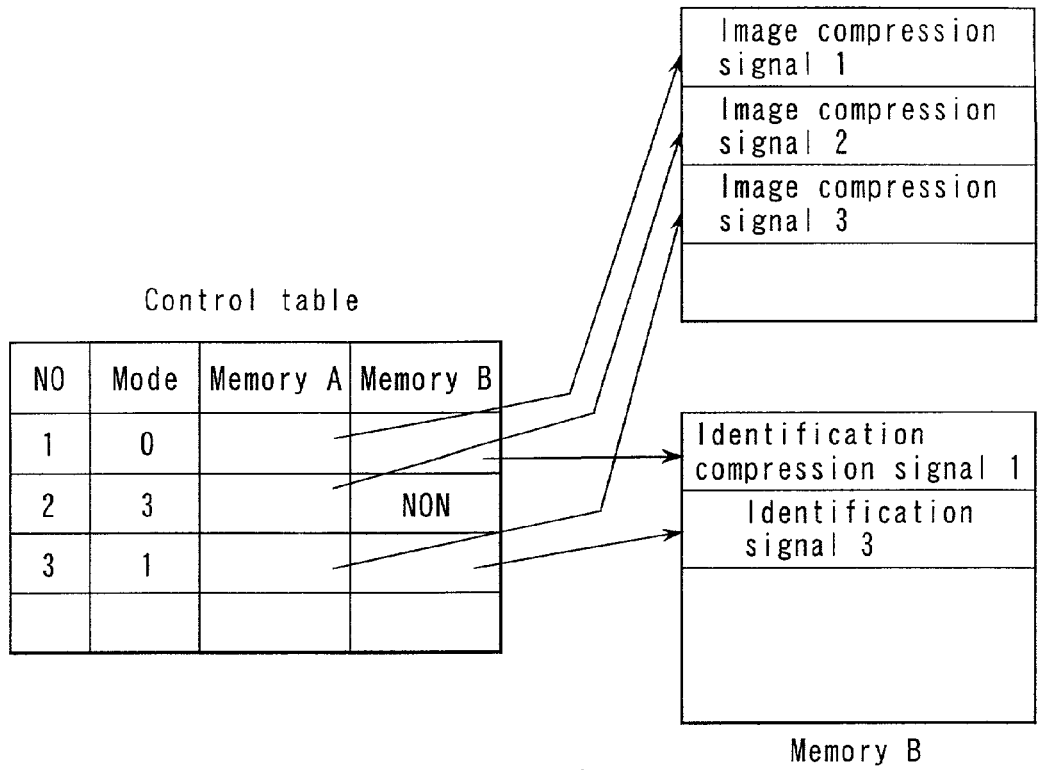
FIG. 23 illustrates processing of the image compression apparatus as the fifth embodiment.
FIG. 24 shows relationship between a mode signal and a mode table for the image compression apparatus as the fifth embodiment.

FIG. 23 depicts a control table provided in the control section 10. For example, mode 0 uses image compression signal 1 in memory A and identification compression signal 1 in memory B. Mode 2 uses only image compression signal 2. Mode 1 uses image compression signal 3 and uncompressed identification signal 3. The control table manages modes of operations for each image and data pointers for images and identifications.

The compression mode setting section 193 in the control section 10 allows mode signals and mode table contents to be set as shown in FIG. 24. According to this setting, it is possible to determine whether to use the identification information for compression, whether to compress the identification signal for storage, or whether to store the identification signal.

The image compression and decompression apparatus according to the fifth embodiment can use mode signal M from the compression mode setting section 193 in the control section 10. According to the content of this mode signal M, the apparatus can specify as needed whether or not to use an identification signal for the color image information and whether or not to compress the identification signal. The apparatus can perform appropriate compression and decompression according to types and uses of the color image information to be processed. Accordingly, it is possible to select an optimal operational environment suited for images types and situations.

Even if the compression mode is used for setting not only usage situations of the identification information about the color image information, but also the method of compressing and using the color image information itself, the compression mode setting section according to the fifth embodiment can likewise select an optimal operational environment.

<Sixth Embodiment>

Figure 26:
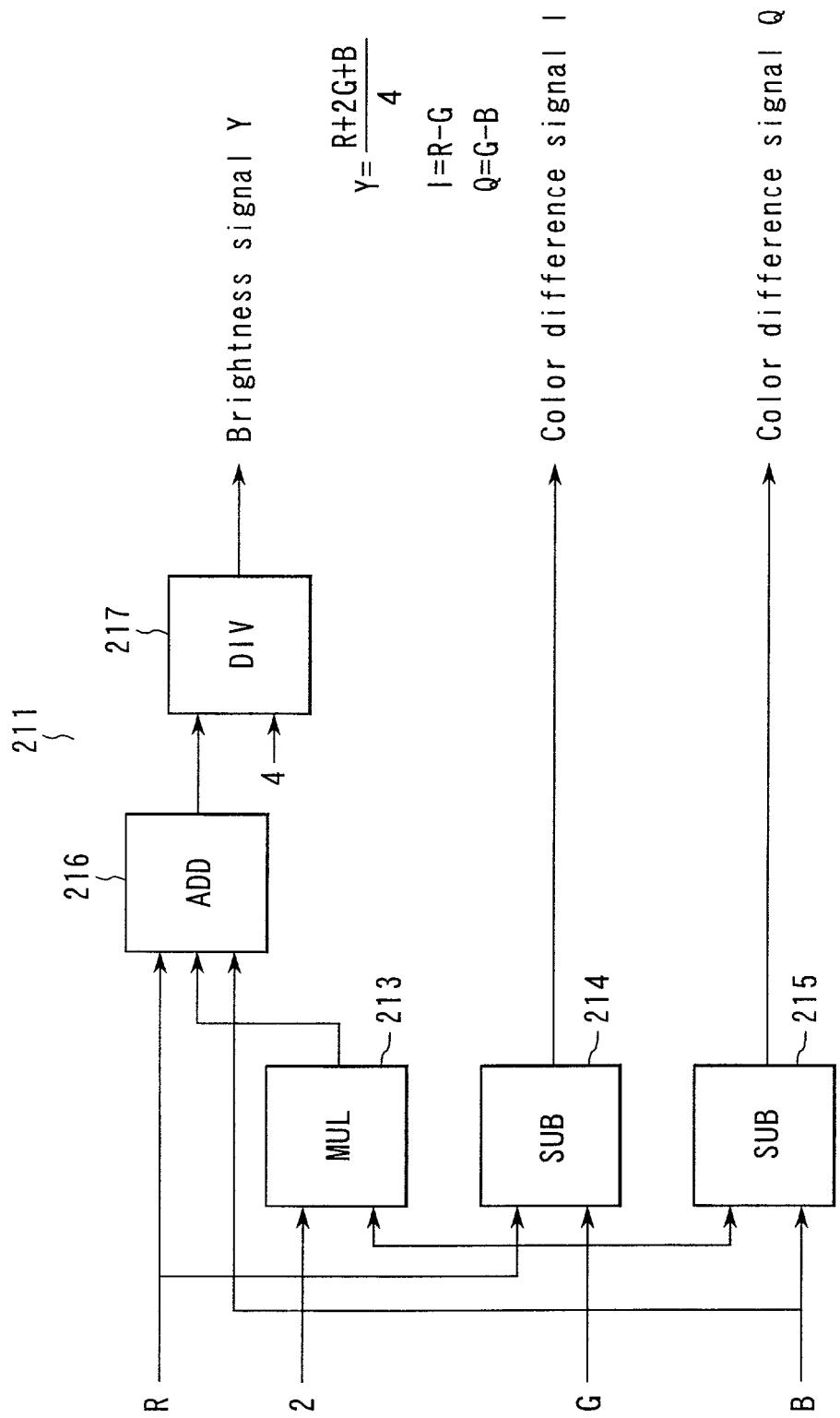
FIG. 26 is a block diagram showing a brightness/color-difference conversion section of the image compression apparatus as the sixth embodiment according to the present invention.
Figure 27:
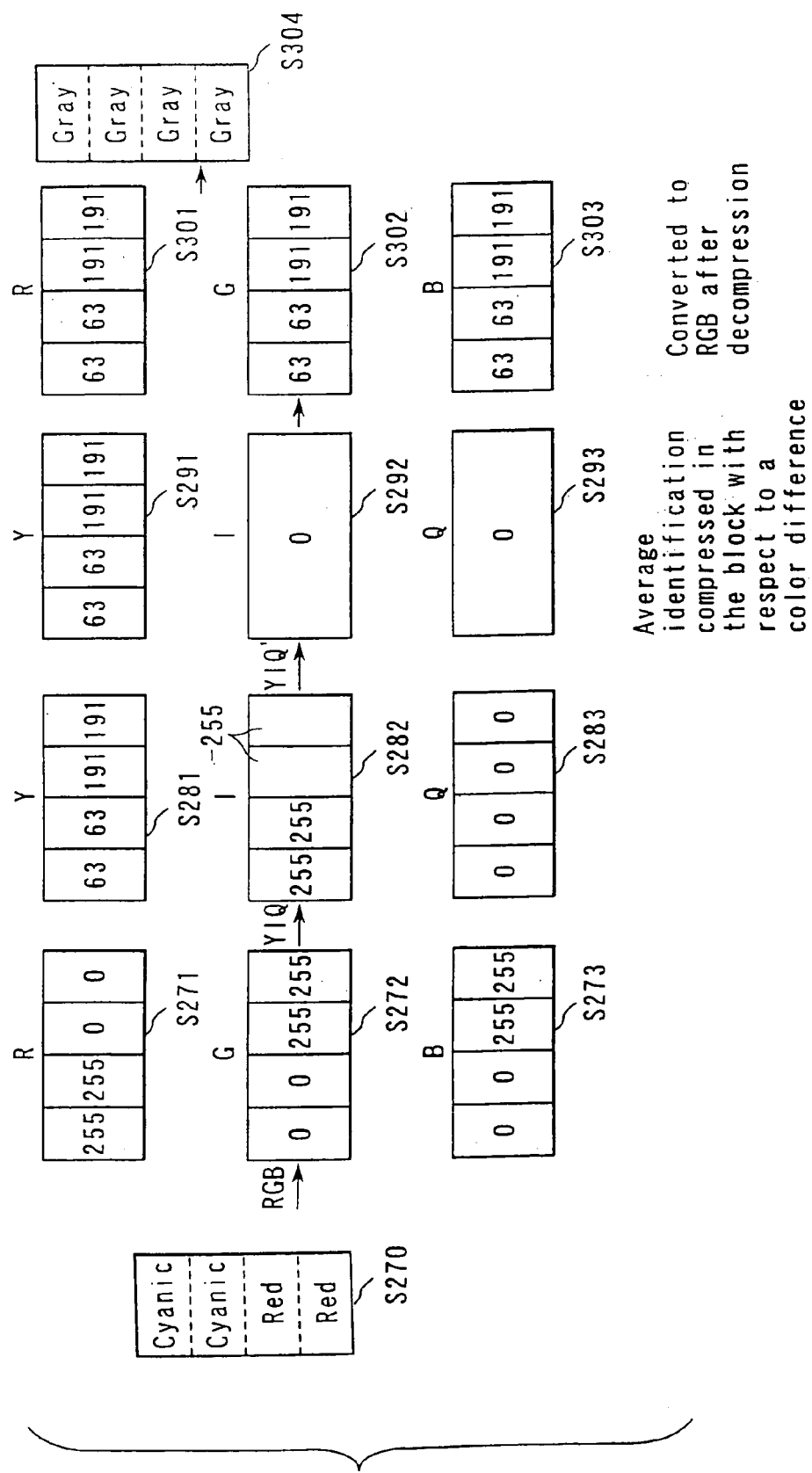
FIG. 27 illustrates problems of the image compression apparatus as the sixth embodiment according to the present invention.
Figure 28:
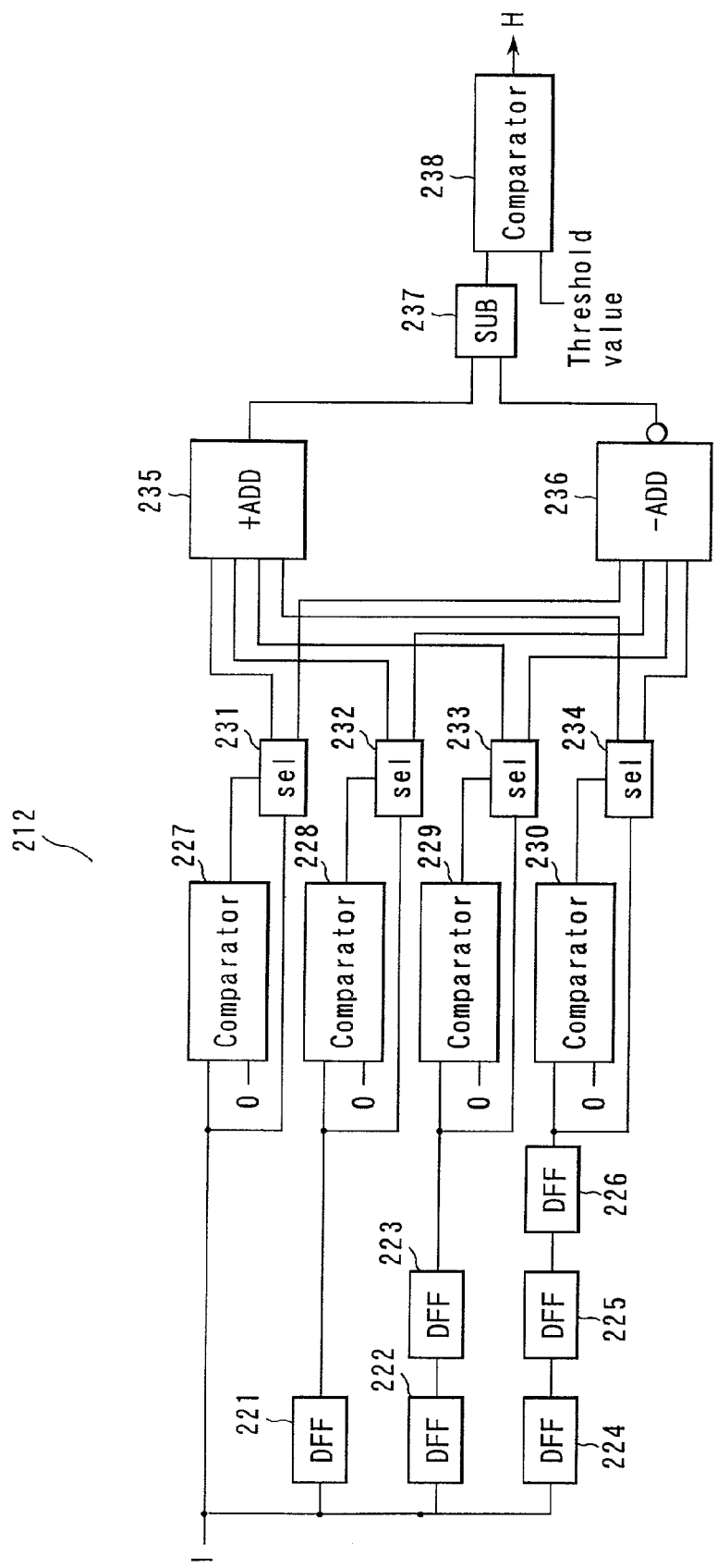
FIG. 28 is a block diagram showing a block identification section of the image compression apparatus as the sixth embodiment according to the present invention.
Figure 29:
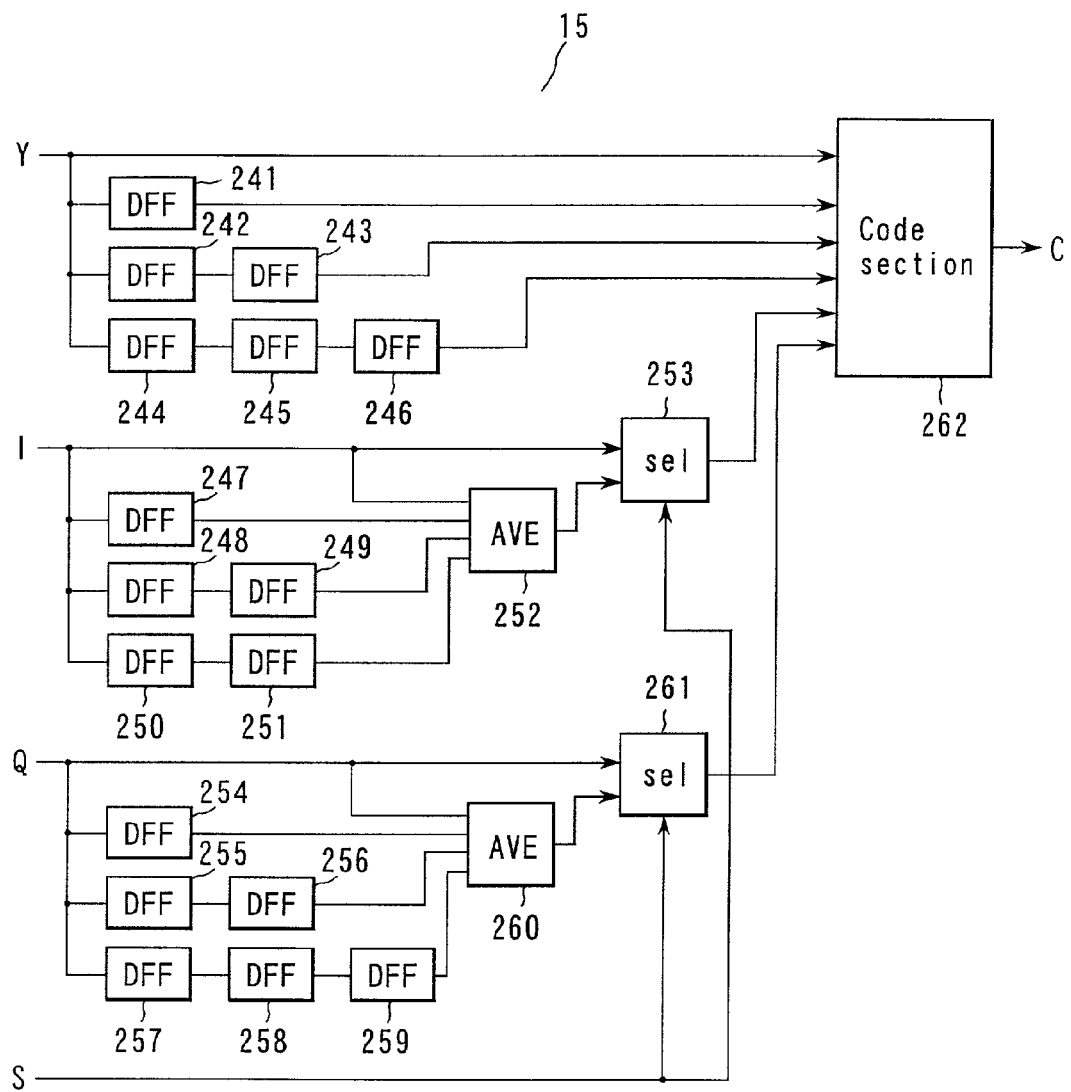
FIG. 29 is a block diagram showing a compression section of the image compression apparatus as the sixth embodiment according to the present invention.

The image compression and decompression apparatus according to the sixth embodiment prevents image quality degradation by applying appropriate processing when detecting complementary color relationship included in the color image information. FIG. 25 is a block diagram showing an image compression apparatus as the sixth embodiment according to the present invention. FIG. 26 is a block diagram showing a brightness/color-difference conversion section. FIG. 27 illustrates problems of the image compression apparatus as the sixth embodiment. FIG. 28 is a block diagram showing a block identification section. FIG. 29 is a block diagram showing a compression section.

A configuration of the image compression and decompression apparatus according to the sixth embodiment can be explained through the use of FIG. 25. This apparatus comprises the scanner 11, a brightness/color-difference conversion section 211, and a block identification section 212. The scanner 11 reads color image information. The brightness/color-difference conversion section 211 converts the read color image information to a brightness/color-difference signal. The brightness/color-difference conversion section 211 supplies brightness signal Y and color difference signals I and Q. The block identification section 212 detects complementary color relationship from the color difference signals I and Q. Further, the image compression and decompression apparatus comprises the image compression section 15, the HDD 21, the image decompression section 16, and the output section 19. The image compression section 15 receives identification signal H indicating the complementary color relationship from the block identification section 212 and compresses brightness signal Y and color difference signals I and Q with different techniques. The HDD 21 stores compressed color image information. The image decompression section 16 decompresses the compressed color image information. The output section 19 prints the decompressed color image information, etc.

The brightness/color-difference conversion section 211 can be explained with reference to FIG. 26. An adder 216 and difference circuits 214 and 215 are supplied with RGB signals respectively and output brightness signal Y and color difference signals I and Q.

The following describes problems of not using the complementary color relationship detection function with reference to FIG. 27. The RGB signals (S271 to S273) are identified as "red/red/cyanic/cyanic" (S270). The brightness/color-difference conversion section 211 converts the RGB signals to brightness/color-difference signals (S281 to S283). Generally, when a color image is compressed, a color signal is first converted to a brightness/color-difference signal before compression. This is because a color difference signal is hardly noticeable compared to a brightness signal if the resolution is lowered. The color difference signal can be set to a higher compression ratio compared to the brightness signal, increasing the entire compression efficiency.

As shown in the figure, however, there may be the case where a compression unit mixedly contains data maintaining complementary color relationship such as red and cyanic. When color differences are simply averaged as a compression technique, for example, the color difference signal becomes 0 (S291 to S293). The decompressed image becomes gray, degrading the image quality (S301 to S304).

The block identification section 212 can be explained in further detail with reference to FIG. 28. Color difference signal Y is processed in units of blocks (in units of four pixels in this example) according to the configuration of latch circuits D-FFs 221 to 226 and comparators 227 to 230. When a value is 0 or larger, a positive-side adder 235 performs addition. When a value is smaller than 0, a negative-side adder 236 performs addition. Based on the following equation in a difference circuit 237, a comparator 238 outputs "1" when the value is greater than the threshold value, assuming that the complementary color is detected. The comparator 238 outputs "0" when the value is smaller than the threshold value, assuming that no complementary color is detected.

Positive-side adder−|Negative-side adder|>Threshold value

While the figure depicts only the I component, the complementary color relationship is also detected for the Q component.

A configuration example of the compression section 15 can be explained in detail with reference to FIG. 29. The compression section comprises latch circuits 241 to 251 and 254 to 259, average value computation circuits 252 and 260, selectors 253 and 261, and a code section 262. The latch circuits 241 to 251 and 254 to 259 are supplied with brightness signal Y and color difference signals I and allows processing in units of blocks. The code section 262 accepts outputs from the selector. In this configuration, brightness signal Y is supplied as 4-pixel data unchanged. Identification signal S selects an average of four pixels or a start value of the block from color difference signals I and Q. The code section 262 outputs compression data C. This solve the problem of color difference signal "0" due to the complementary color relationship.

While this example uses only the color difference signal for determining the complementary color relationship, it may be preferable to use the brightness signal or other identification signals such as a character, a photo, etc. This embodiment selects an average value of color difference signals or a block start value. It may be preferable to select other pixel positions or an average value for the positive side or the negative side or to select values accordingly based on information about the adjacent pixel arrangement. It may be also preferable not to compress a color difference signal when the complementary color relationship is available or to lower a compression ratio.

The embodiment according to the present invention uses an average of color difference signals for the compression method. However, the compression method is not limited thereto. Various compression methods are applicable.

The compression apparatus according to the sixth embodiment of the present invention divides the color image information into brightness/color-difference signals for compression in units of blocks. A different compression process is selected by using a result of the identification apparatus identifying the complementary color relationship in a block. It is possible to provide the image compression and decompression apparatus capable of preventing image quality degradation due to a grayed complementary color block.

As mentioned above in detail, the present invention corrects characteristics of the image information based on a compression unit for image compression. Even if a compressed image is decompressed again, an effect of the correction is ensured. Therefore, it is possible to provide the image compression and decompression apparatus and the image compression and decompression method capable of preventing image quality degradation due to image compression and decompression.

What is claimed is:

1. An image compression and decompression apparatus comprising:
   an identification section that identifies given color image information and outputs an identification signal;
   a conversion section that converts said color image information to color image information with a specified length in units of blocks;
   a characteristics correction section that corrects block-based color image information converted in said conversion section with respect to characteristics thereof in units of said blocks based on the identification signal output from said identification section;
   an image compression section that compresses the image corrected in said characteristics correction section in units of said blocks and stores the compressed image in a storage area; and
   a decompression section that decompresses the compressed image stored in said storage area in units of said blocks,
   wherein said characteristics correction section corrects an average value of three RGB signals and each of RGB outputs to a value resulting in a black character based on a compression unit according to a black character identification signal from said identification section.

2. An image compression and decompression method comprising:
   an identification step for identifying given color image information and outputting an identification signal;
   a conversion step for converting said color image information to block-based color image information having a specified length;
   a characteristics correction for correcting block-based color image information converted at said conversion step with respect to characteristics thereof in units of said blocks based on the identification signal output from said identification step;
   an image compression step for compressing an image corrected at said characteristics correction step in units of said blocks and storing the same in a storage area; and
   a decompression step for decompressing the compressed image stored in said storage area in units of said blocks,
   wherein said characteristics correction step corrects an average value of three RGB signals and each of RGB outputs to a value resulting in a black character according to a black character identification signal from said identification section.

* * * * *